(12) United States Patent
Singh et al.

(10) Patent No.: US 11,823,064 B2
(45) Date of Patent: *Nov. 21, 2023

(54) ENTERPRISE MARKET VOLATILITY PREDICTION THROUGH SYNTHETIC DNA AND MUTANT NUCLEOTIDES

(71) Applicant: Bank of America Corporation, Charlotte, NC (US)

(72) Inventors: Manmohan Singh, New Delhi (IN); Shantanu Singh, Gurugram (IN); Vineet Kumar Upadhyay, Hyderabad (IN); Madhusudhanan Krishnamoorthy, Madavarvalagam (IN); Amit Ohri, Gurugram (IN); Ruchi Mathur, Hyderabad (IN); Kapil Juneja, Jaipur (IN); Karishma Prithviraj Pamnani, Mumbai (IN); Yudhit Mehta, Charlotte (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/334,086

(22) Filed: May 28, 2021

(65) Prior Publication Data

US 2022/0383135 A1 Dec. 1, 2022

(51) Int. Cl.
*G06Q 30/02* (2023.01)
*G06N 3/123* (2023.01)
*G06Q 30/0202* (2023.01)

(52) U.S. Cl.
CPC ......... *G06N 3/123* (2013.01); *G06Q 30/0202* (2013.01)

(58) Field of Classification Search
CPC .......................... G06N 3/123; G06Q 30/0202
See application file for complete search history.

(56) References Cited

U.S. PATENT DOCUMENTS 9,996,778 B2 6/2018 Church
10,370,246 B1 8/2019 Milenkovic et al.
(Continued)

FOREIGN PATENT DOCUMENTS

| EP | 3682449 | 7/2020 |
| EP | 3682449 A1 | 7/2020 |
| WO | 2019226314 A1 | 11/2019 |

OTHER PUBLICATIONS

DNA as digital information storage device: hope or hype (Darshan Panda, Springer Publisher, 3 Biotech May 4, 2018, 8:238, https://doi.org/10.1007/s13205-018-1246-7 (Year: 2018).*
(Continued)

*Primary Examiner* — Breffni Baggot
(74) *Attorney, Agent, or Firm* — Banner & Witcoff, Ltd.

(57) ABSTRACT

Aspects of the disclosure relate to using synthetic DNA stranding and mutant nucleotide processes to conduct enterprise market volatility predictions. In some embodiments, a computing platform may initiate a set of instructions associated with performing an action on a synthetic DNA market data set associated with a plurality of lines of business across an enterprise organization. Thereafter, the computing platform may convert the set of instructions to a mutant nucleotide sequence, and insert the mutant nucleotide sequence into the synthetic DNA market data set. The computing platform may extract, using the mutant nucleotide sequence, target information from the synthetic DNA market data set, and validate the target information to detect one or more anomalies. The computing platform may remove the one or more data anomalies, and subsequently output a validated synthetic DNA market data set to a synthetic DNA client server.

20 Claims, 17 Drawing Sheets

(56) References Cited

U.S. PATENT DOCUMENTS

| | | |
|---|---|---|
| 10,387,301 B2 | 8/2019 | Goldman et al. |
| 10,650,312 B2 | 5/2020 | Roquet et al. |
| 11,341,598 B2 | 5/2022 | Liu et al. |
| 2005/0053968 A1 | 3/2005 | Bharadwaj et al. |
| 2016/0171398 A1* | 6/2016 | Eder .................. G06Q 30/0201 |
| | | 705/7.28 |
| 2017/0141793 A1 | 5/2017 | Strauss et al. |
| 2019/0370694 A1* | 12/2019 | Diamanti ............... G06N 20/20 |
| 2021/0049699 A1* | 2/2021 | Chiu ........................ G06N 5/04 |
| 2021/0050073 A1* | 2/2021 | Chen ........................ C40B 40/06 |
| 2022/0101438 A1* | 3/2022 | Gao .................. G06Q 30/0201 |
| 2022/0138857 A1* | 5/2022 | Sun ................... G06Q 30/0201 |
| | | 705/36 R |
| 2022/0188850 A1 | 6/2022 | Costabello et al. |

OTHER PUBLICATIONS

Koch J, Gantenbein S, Masania K, Stark W, Erlich Y, Grass R. A DNA-of-things storage architecture to create materials with embedded memory. Nat Biotechnol. 2019;38(1):39-45 (Year: 2020).*

Koch, Julian "Reading and Writing Digital Data in DNA" Nature Protocols vol. 15 Jan. 2020, p. 86-101 (Year: 2020).*

Wiley Encyclopedia of Computer Science and Engineering (Year: 2009).*

Yaniv Erlich "DNA Fountain enables a Robust and Efficient Storage Architecture" Science 355:950-954 (Year: 2017).*

\* cited by examiner

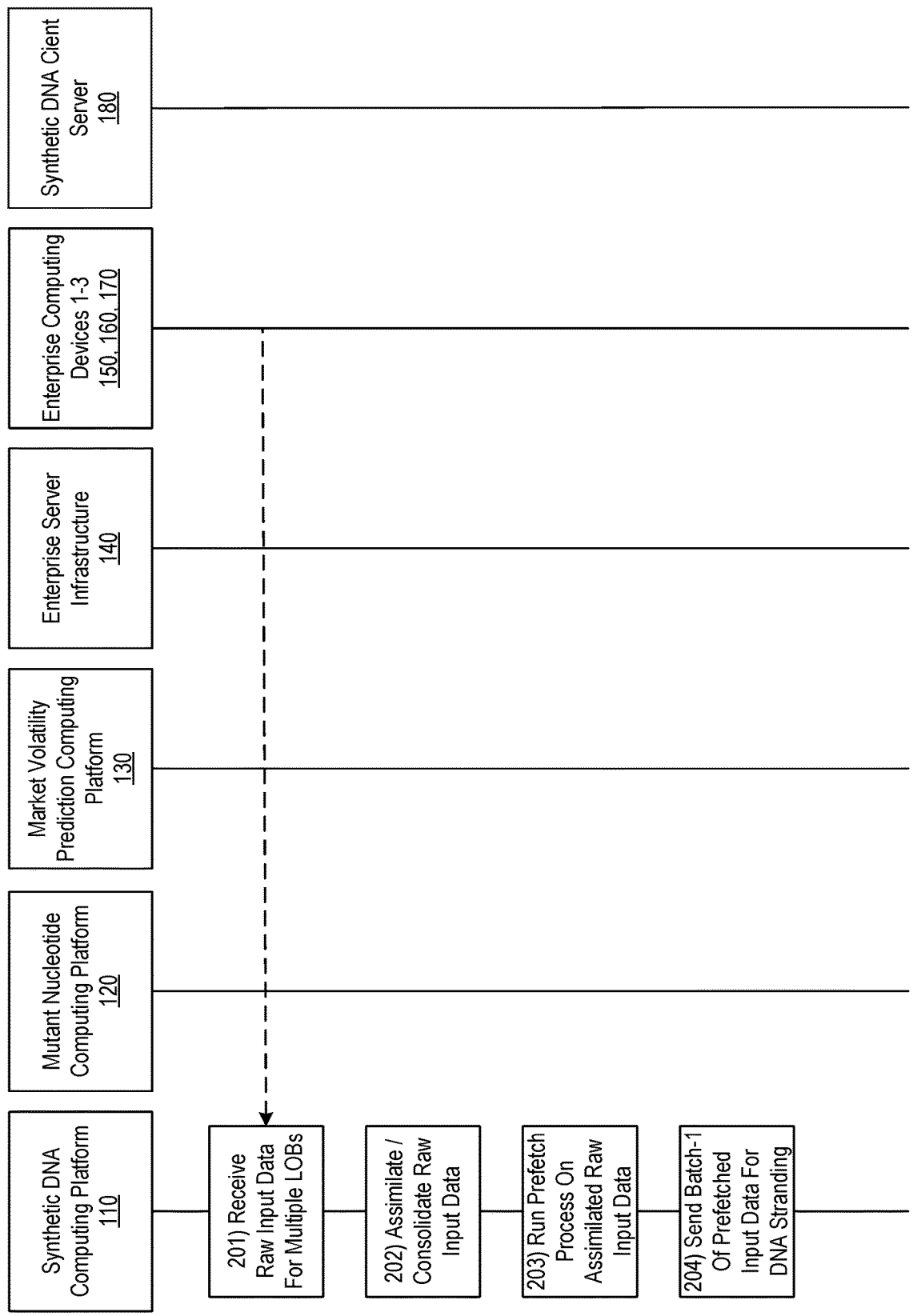

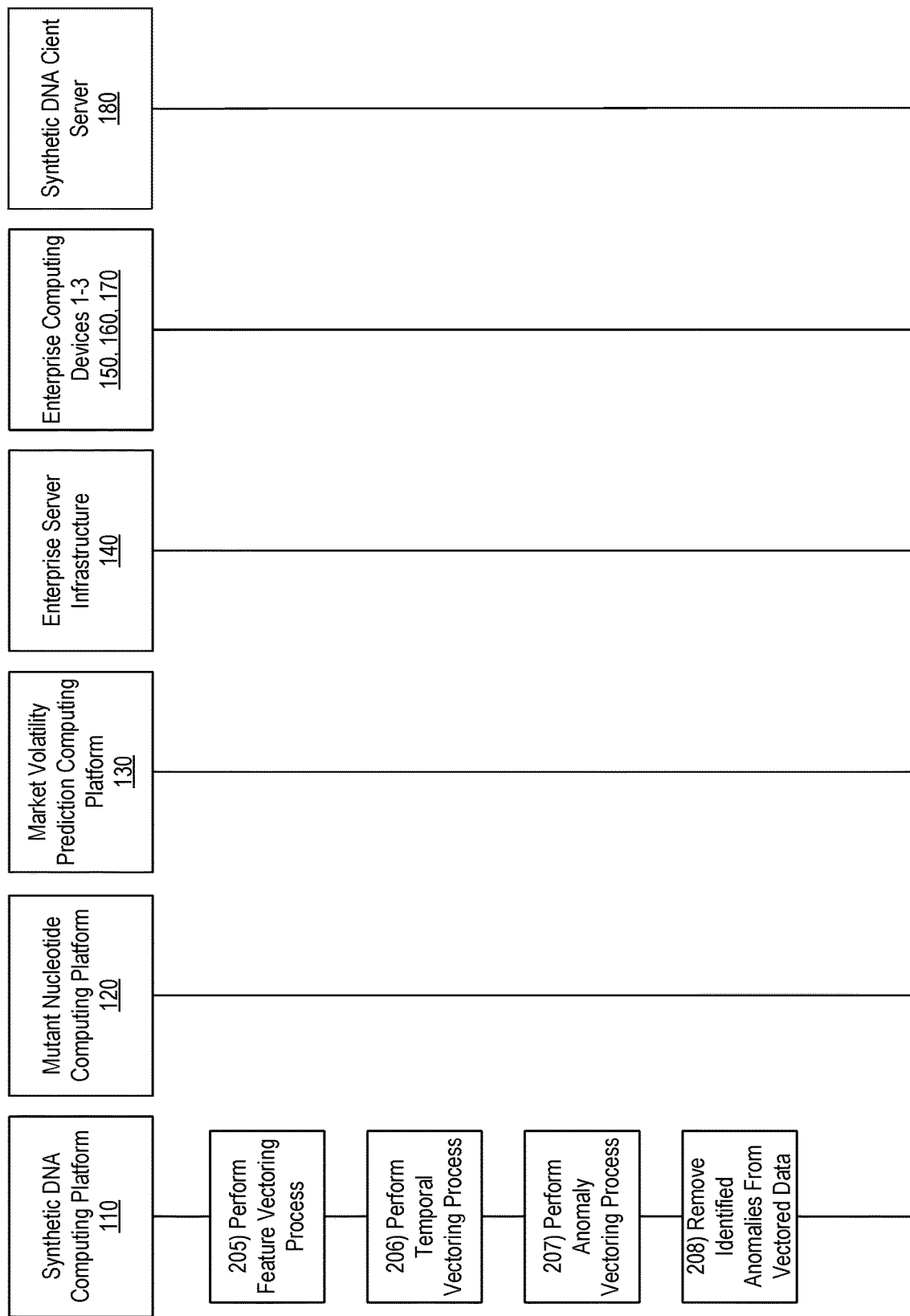

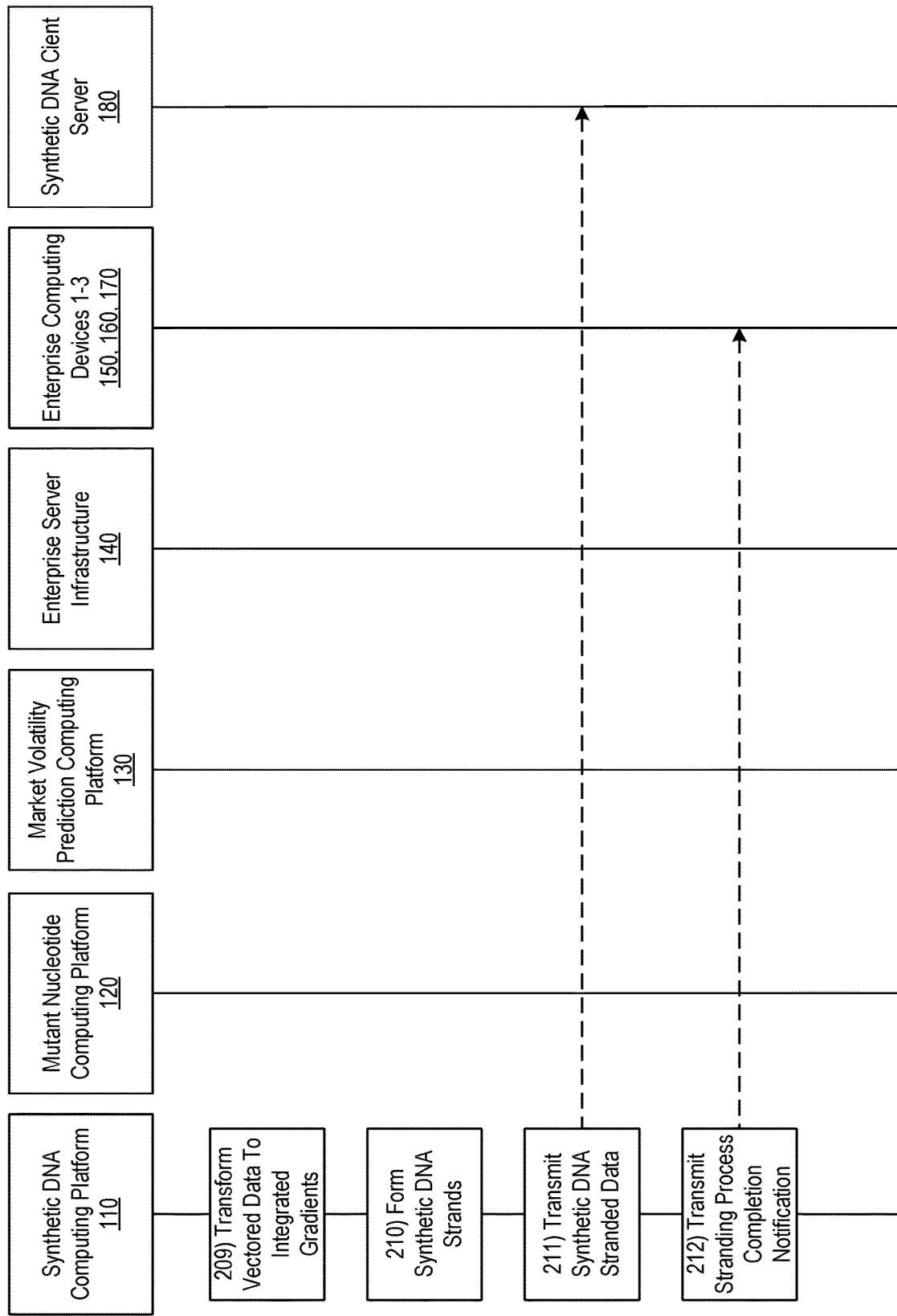

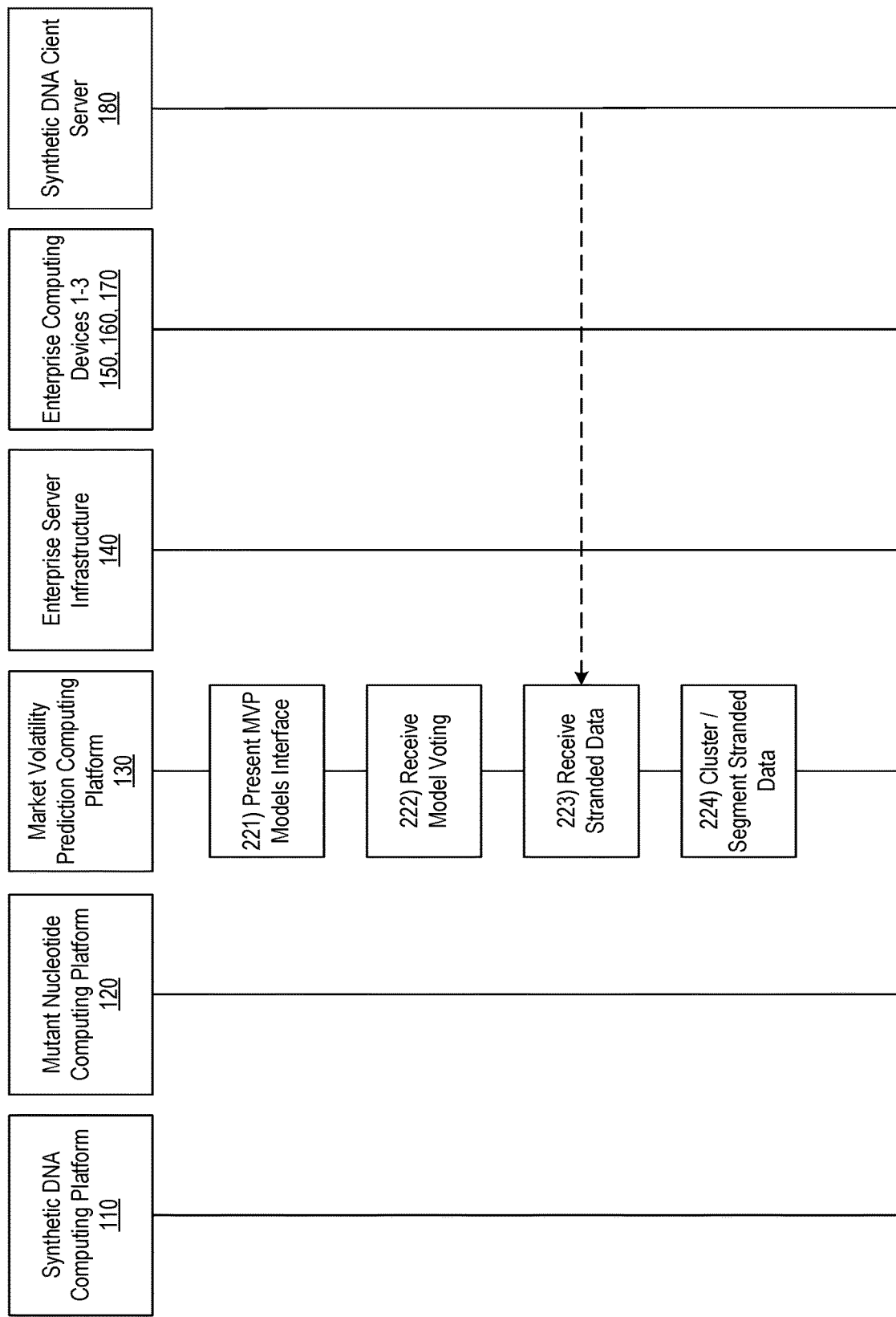

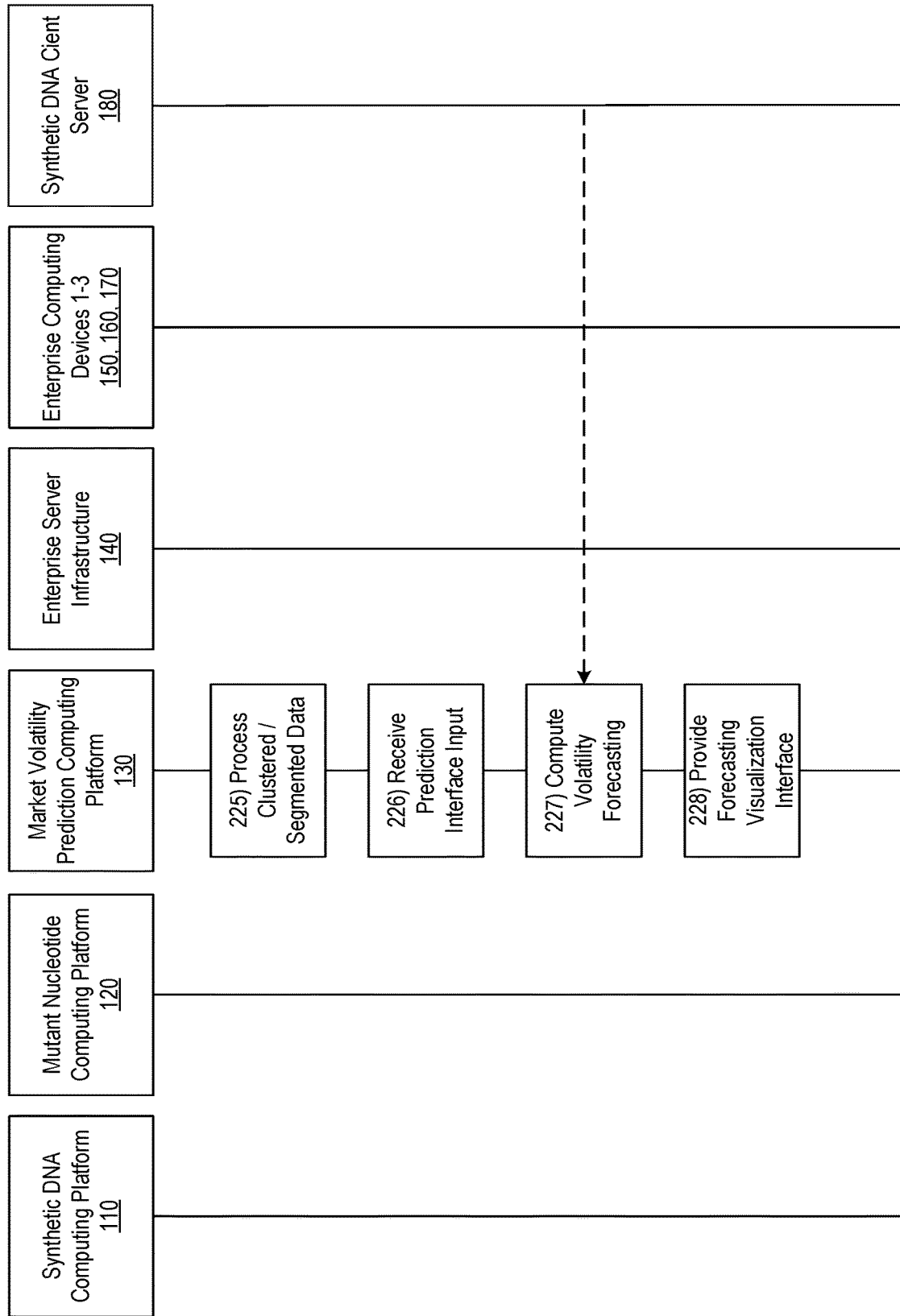

ENTERPRISE MARKET VOLATILITY PREDICTION THROUGH SYNTHETIC DNA AND MUTANT NUCLEOTIDES

BACKGROUND

Aspects of the disclosure relate to computer systems and networks. In particular, one or more aspects of the disclosure relate to synthetic deoxyribonucleic acid (DNA) and mutant nucleotide computer techniques to conduct enterprise-wide market volatility predictions, e.g., predictions across multiple lines of business of an enterprise organization.

As computer systems are increasingly tasked with providing electronic services capable of handling multiple models and large quantities of data, computational and data storage constraints are constant issues. Market volatility prediction and forecasting models provide one example of such challenging tasks that involve significant manual processing to manage computational models and the related data sets. Databases storing market volatility data are often maintained in an inefficient manner that requires large data storage capacity. Handling these data sets involve time consuming processes and often result in less accurate predictive modeling. Further, many models are operable only for one or a few lines of business, and are not suitable for modeling at an enterprise level. In this regard, current systems are unable to assimilate market data from many different lines of business for validation at an enterprise level. There is a need for robust computational platforms capable of processing data in centralized manner.

SUMMARY

Aspects of the disclosure provide effective, efficient, scalable, and convenient technical solutions that address and overcome the technical problems associated with optimizing the efficient and effective technical operations of computer systems. In particular, one or more aspects of the disclosure provide techniques for using synthetic DNA stranding and mutant nucleotide processes to conduct enterprise market volatility predictions.

Synthetic DNA Stranding Aspects

In accordance with one or more embodiments, a computing platform having at least one processor, a communication interface, and memory may receive market data from a plurality of lines of business across an enterprise in a raw, uncompressed format. Subsequently, the computing platform may assimilate the market data into one or more market data clusters, and preprocess the one or more market data clusters through at least one vectoring process to output vectored market data. The computing platform may thereafter perform a synthetic DNA stranding process on the vectored market data to create one or more strands of synthetic DNA market data, and output the one or more strands of synthetic DNA market data to a synthetic DNA client server. The one or more strands of synthetic DNA market data may be configured for input in a market volatility prediction model.

In some embodiments, the computing platform may run a prefetch process on the assimilated market data, where the prefetch process includes splitting the assimilated data into a plurality of batches and discretizing each of the plurality of batches. Subsequently, the computing platform may send a first batch of discretized market data to a synthetic DNA stranding process module prior to discretizing a second batch of market data. In some examples, assimilating the market data into one or more market data clusters includes consolidating the market data into one or more Hadoop clusters.

In some arrangements, preprocessing the one or more market data clusters through at least one vectoring process includes performing a feature vectoring process that includes encoding a first batch of market data in a long short-term memory network. In some examples, preprocessing the one or more market data clusters through at least one vectoring process includes performing a temporal vectoring process that includes linking or concatenating temporal aspects of a first batch of market data into a series of temporal vectors. Preprocessing the one or more market data clusters through at least one vectoring process may include performing an anomaly vectoring process that includes applying a classification model to a first batch of market data to detect an anomaly relative to surrounding data. The anomaly vectoring process may further include removing data associated with the detected anomaly from the first batch of market data.

In some embodiments, performing synthetic DNA stranding on the preprocessed market data includes transforming the preprocessed market data into a plurality of integrated gradients, where the one or more strands of synthetic DNA market data comprise a sequence of integrated gradients. In some examples, the computing platform may transmit a notification to an enterprise computing device that indicates a completion status of the synthetic DNA stranding process and a data set associated with the completed synthetic DNA stranding process.

In accordance with one or more embodiments, a method is provided at a computing platform comprising at least one processor, a communication interface, and memory. The method may include receiving a first set of market data from a first line business of an enterprise, wherein the first set of market data is received in a raw, uncompressed format, and receiving a second set of market data from a second line business of an enterprise, wherein the second set of market data is received in a raw, uncompressed format. The first set of market data and the second set of market data may then be assimilated to form a market data cluster, and the market data cluster may be preprocessed with at least one vectoring process to output vectored market data. A synthetic DNA stranding process may then be performed on the vectored market data to create one or more strands of synthetic DNA market data. Thereafter, the one or more strands of synthetic DNA market data may be output to a synthetic DNA client server. The one or more stands of synthetic DNA market data may be configured for input in a market volatility prediction model.

In some example arrangements, the method may include performing a prefetch process on the market data cluster that includes splitting the market cluster data into a plurality of batches and discretizing each of the plurality of batches. In addition, the prefetch process may include sending a first batch of discretized market data to a synthetic DNA stranding process module prior to discretizing a second batch of market data. In some examples, preprocessing the market data cluster with at least one vectoring process includes performing a feature vectoring process that includes encoding a first batch of market data in a long short-term memory network. Preprocessing the market data cluster with at least one vectoring process may include performing a temporal vectoring process that includes concatenating temporal aspects of a first batch of market data into a series of temporal vectors. Preprocessing the market data cluster with at least one vectoring process may include performing an anomaly vectoring process that includes applying a classification model to a first batch of market data to detect an anomaly relative to surrounding data, and removing data associated with the detected anomaly from the first batch of market data.

In some embodiments, performing the synthetic DNA stranding process on the vectored market data includes transforming the vectored market data into a plurality of integrated gradients. The one or more strands of synthetic DNA market data may then comprise a sequence of integrated gradients. In some examples, the method includes transmitting a notification to an enterprise computing device that indicates a completion status of the synthetic DNA stranding process and a data set description associated with the one or more stands of synthetic DNA market data. The method may include receiving a third set of market data from a third line business of an enterprise in a raw, uncompressed format, and may then include assimilating the third set of market data with the first set of market data and the second set of market data to form the market data cluster.

In accordance with one or more embodiments, one or more non-transitory computer-readable media may be provided storing instructions that, when executed by a computing platform comprising at least one processor, a communication interface, and memory cause the computing platform to receive market data from a plurality of lines of business across an enterprise, wherein the market data is received in a raw, uncompressed format, assimilate the market data into at least one market data cluster, preprocess the one or more market data clusters through at least one vectoring process to output vectored market data, perform a synthetic DNA stranding process on the vectored market data to create synthetic DNA stranded market data, and output the synthetic DNA stranded market data to a synthetic DNA client server that is configured to input the synthetic DNA stranded market data into a market volatility prediction model.

Mutant Nucleotide Aspects

In accordance with one or more embodiments, a computing platform having at least one processor, a communication interface, and memory may initiate a set of instructions associated with performing an action on a synthetic DNA market data set that includes market data associated with a plurality of lines of business across an enterprise organization. Subsequently, the computing platform may convert the set of instructions to a mutant nucleotide sequence, insert the mutant nucleotide sequence into the synthetic DNA market data set, and extract target information from the synthetic DNA market data set using the mutant nucleotide sequence. The computing platform may then validate the target information, wherein validating the target information includes applying validation rules to the target information, and analyzing the target information to detect one or more anomalies. Upon detecting one or more data anomalies, the computing platform may remove the one or more data anomalies to form a validated synthetic DNA market data set. Thereafter, the computing platform may output the validated synthetic DNA market data set to a synthetic DNA client server configured to input the validated synthetic DNA market data set into a market volatility prediction model.

In some embodiments, extracting the target information includes conjugating the mutant nucleotide sequence into the synthetic DNA market data set and obtaining the target information from the synthetic DNA market data set. In some examples, validating the target information includes comparing the target information to a baseline data structure and identifying the one or more anomalies based on comparing the target information to the baseline data structure. In some examples, validating the target information includes extracting a first component from the synthetic DNA market data set and a second component from the synthetic DNA market data set, wherein the first component is associated with data from a first line of business and the second component is associated with data from a second line of business, comparing the first component to the second component to assess a difference in a data structure characteristic, and modifying at least of portion of the first component based on assessing a difference in the data structure characteristic of the first component relative to the second component. In some examples, validating the target information includes extracting market volatility model input data from the target information, and performing an input data check on the extracted market volatility model input data to validate the extracted market volatility model input data as input to an associated market volatility model.

In some arrangements, removing the one or more data anomalies to form a validated synthetic DNA market data set includes initiating a set of anomaly instructions to remove the one or more data anomalies, converting the set of anomaly instructions to a mutant nucleotide anomaly removal sequence, inserting the mutant nucleotide anomaly removal sequence into the synthetic DNA market data set, and removing the one or more data anomalies from the synthetic DNA market data set using the mutant nucleotide anomaly removal sequence. In some examples, removing the one or more data anomalies to form a validated synthetic DNA market data set includes transforming at least one strand of the synthetic DNA market data set to form a modified synthetic DNA strand.

In some examples, the computing platform may provide a results display on a display of the computing platform that includes information relating to validating the target information extracted by the mutant nucleotide sequence. In some examples, the computing platform may provide a results display on a display of the computing platform that includes information relating to a set of instructions associated with performing an action on a synthetic DNA market data set and a status of the validated synthetic market DNA data set. In addition, the computing platform may receive a user interaction with the results display relating to performing additional validation on the validated synthetic DNA market data set, initiate a second set of instructions associated with performing a second action on the validated synthetic DNA market data set, and convert the second set of instructions to a second mutant nucleotide sequence configured to perform a second validation on the validated synthetic DNA market data set.

In accordance with one or more embodiments, a method is provided at a computing platform comprising at least one processor, a communication interface, and memory. The method may include initiating a set of instructions associated with performing an action on a synthetic DNA market data set that includes market data associated with a plurality of lines of business across an enterprise organization. The method may then include converting the set of instructions to a mutant nucleotide sequence, inserting the mutant nucleotide sequence into the synthetic DNA market data set, and extracting target information from the synthetic DNA market data set using the mutant nucleotide sequence. Subsequently, the method may include validating the extracted target information to form a validated synthetic DNA market data set, outputting the validated synthetic DNA market data set to a synthetic DNA client server that is configured to input the validated synthetic DNA market data set into a market volatility prediction model, and providing a results display on a display of the computing platform that includes information relating to a status of the validated synthetic DNA market data set.

In some embodiments, validating the target information includes applying validation rules to the target information, and analyzing the target information to detect one or more anomalies. In addition, the method may include removing the one or more data anomalies to form the validated synthetic DNA market data set upon detecting one or more data anomalies. Extracting the target information may include conjugating the mutant nucleotide sequence into the synthetic DNA market data set and obtaining the target information from the synthetic DNA market data set.

In some arrangements, validating the target information includes comparing the target information to a baseline data structure and identifying the one or more anomalies based on comparing the target information to baseline data structure. In some examples, validating the target information includes extracting a first component from the synthetic DNA market data set and a second component from the synthetic DNA market data set, wherein the first component is associated with data from a first line of business and the second component is associated with data from a second line of business, comparing the first component to the second component to assess differences in a data structure characteristic, and modifying at least of portion of the first component based on assessing a difference in the data structure characteristic of the first component relative to the second component. In some examples, validating the target information may include extracting market volatility model input data from the target information, and performing an input data check on the extracted market volatility model input data to validate the extracted market volatility model input data as input to an associated market volatility model.

In some embodiments, providing the results display includes providing a display interface component that includes information relating to validating the target information extracted by the mutant nucleotide sequence. In some examples, the method may further include receiving a user interaction with the results display relating to performing additional validation on the validated synthetic DNA market data set, initiating a second set of instructions associated with performing a second action on the validated synthetic DNA market data set, and converting the second set of instructions to a second mutant nucleotide sequence configured to perform a second validation on the validated synthetic DNA market data set.

In accordance with one or more embodiments, one or more non-transitory computer-readable media may be provided storing instructions that, when executed by a computing platform comprising at least one processor, a communication interface, and memory cause the computing platform to initiate a set of instructions associated with performing an action on a synthetic DNA market data set, wherein the synthetic DNA market data set includes market data associated with a plurality of lines of business across an enterprise organization, convert the set of instructions to a mutant nucleotide sequence, insert the mutant nucleotide sequence into the synthetic DNA market data set, extract target information from the synthetic DNA market data set using the mutant nucleotide sequence, validate the extracted target information, wherein validating the extracted target information includes applying validation rules to the target information and analyzing the target information to detect one or more anomalies, upon detecting one or more data anomalies, remove the one or more data anomalies to form a validated synthetic DNA market data set, and provide a results display on a display of the computing platform, wherein the results display includes information relating to a status of the validated synthetic DNA market data set.

Market Volatility Model Aspects

In accordance with one or more embodiments, a computing platform having at least one processor, a communication interface, and memory may receive raw market data from a plurality of lines of business of an enterprise organization. Subsequently, the computing platform may preprocess the raw market data to obtain enterprise level market data, execute synthetic DNA stranding of the enterprise level market data to obtain synthetic DNA stranded market data, run the synthetic DNA stranded market data through one or more market volatility models, and compile results from the one or more market volatility models on the synthetic DNA stranded market data. The computing platform may thereafter transmit, via the communication interface, results from the one or more market volatility models on the synthetic DNA stranded market data, wherein the transmitted results are configured to display a market application interface that includes one or more market volatility forecasting parameters based on results of the one or more market volatility models.

In some arrangements, the computing platform may present a market volatility model selection interface that includes a plurality of market volatility forecasting models and receive a user selection corresponding to at least one of the plurality of market volatility forecasting models. Subsequently, running the synthetic DNA stranded market data through one or more market volatility models may include running the at least one of the plurality of market volatility forecasting models corresponding to the user selection. In some examples, the computing platform may receive a model algorithm prediction corresponding to the one or more market volatility models. Subsequently, the synthetic DNA stranded market data may be run through one or more market volatility models in accordance with the model algorithm prediction.

In some embodiments, running the synthetic DNA stranded market data through one or more market volatility models includes clustering and segmenting the synthetic DNA stranded market data. In some examples, compiling results from the one or more market volatility models on the synthetic DNA stranded market data includes presenting a prediction interface, receiving at least one user selection at the prediction interface relating to a setting for the one or more market volatility models, and computing a volatility forecasting parameter in accordance with the at least one user selection.

In some examples, the computing platform may update the one or more market volatility models using a machine learning model and based on results from the one or more market volatility models. The computing platform may update at least one volatility factor specific to a business for the one or more market volatility models using a machine learning model and based on results from the one or more market volatility models. In addition, the computing platform may receive an updated model algorithm prediction via the market application interface, wherein the updated model algorithm prediction is associated with the results from the one or more market volatility models, and wherein the one or more market volatility models are updated based on the updated model algorithm prediction.

In some embodiments, the computing platform may output the synthetic DNA stranded market data to a synthetic DNA client server that is configured to store the synthetic DNA stranded market data and provide at least a portion of the synthetic DNA stranded market data to the computing platform responsive to a data request. In some examples, the computing platform may receive a user interaction with the market application interface relating to executing an additional market volatility model on the synthetic DNA stranded market data, run the synthetic DNA stranded market data through the additional market volatility model, and transmit, via the communication interface, results from the additional market volatility model to the market application interface.

In accordance with one or more embodiments, a method is provided at a computing platform comprising at least one processor, a communication interface, and memory. The method may include receiving raw market data from a plurality of lines of business of an enterprise organization, preprocessing the raw market data to obtain enterprise level market data, executing synthetic DNA stranding of the enterprise level market data to obtain synthetic DNA stranded market data, executing one or more market volatility models with the synthetic DNA stranded market data, compiling results from the one or more market volatility models on the synthetic DNA stranded market data, and providing a results display to a market application interface via the communication interface. The results display may include results from the one or more market volatility models on the synthetic DNA stranded market data and one or more market volatility forecasting parameters based on results of the one or more market volatility models.

In some embodiments, the method further includes presenting a plurality of market volatility forecasting models at the market volatility model selection interface, and receiving a user selection corresponding to at least one of the plurality of market volatility forecasting models. Running the synthetic DNA stranded market data through one or more market volatility models may then include running the at least one of the plurality of market volatility forecasting models corresponding to the user selection.

In some embodiments, the method further includes receiving a model algorithm prediction corresponding to the one or more market volatility models. The synthetic DNA stranded market data may then be run through one or more market volatility models in accordance with the model algorithm prediction. In some examples, running the synthetic DNA stranded market data through one or more market volatility models includes clustering and segmenting the synthetic DNA stranded market data.

In some embodiments, compiling results from the one or more market volatility models on the synthetic DNA stranded market data includes presenting a prediction interface, receiving at least one user selection at the prediction interface relating to a setting for the one or more market volatility models, and computing a volatility forecasting parameter in accordance with the at least one user selection. In some examples, the method may further include updating the one or more market volatility models using a machine learning model and based on results from the one or more market volatility models. The method may then include updating at least one volatility factor specific to a business for the one or more market volatility models using a machine learning model and based on results from the one or more market volatility models. In addition, the method may include receiving an updated model algorithm prediction via the market application interface, wherein the updated model algorithm prediction is associated with the results from the one or more market volatility models, and wherein the one or more market volatility models are updated based on the updated model algorithm prediction.

In some embodiments, the method may further include outputting the synthetic DNA stranded market data to a synthetic DNA client server that is configured to store the synthetic DNA stranded market data and provide at least a portion of the synthetic DNA stranded market data to the computing platform responsive to a data request.

In accordance with one or more embodiments, one or more non-transitory computer-readable media may be provided storing instructions that, when executed by a computing platform comprising at least one processor, a communication interface, and memory cause the computing platform to receive raw market data from a plurality of lines of business of an enterprise organization, preprocess the raw market data to obtain enterprise level market data, execute synthetic DNA stranding of the enterprise level market data to obtain synthetic DNA stranded market data, run the synthetic DNA stranded market data through one or more market volatility models, and transmit, via the communication interface, results from the one or more market volatility models on the synthetic DNA stranded market data, wherein the transmitted results are configured to display a market application interface, and wherein the market application interface includes one or more market volatility forecasting parameters based on results of the one or more market volatility models.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for using synthetic DNA stranding and mutant nucleotide processes to conduct enterprise market volatility predictions in accordance with one or more example embodiments;

DETAILED DESCRIPTION

Figure 1A:
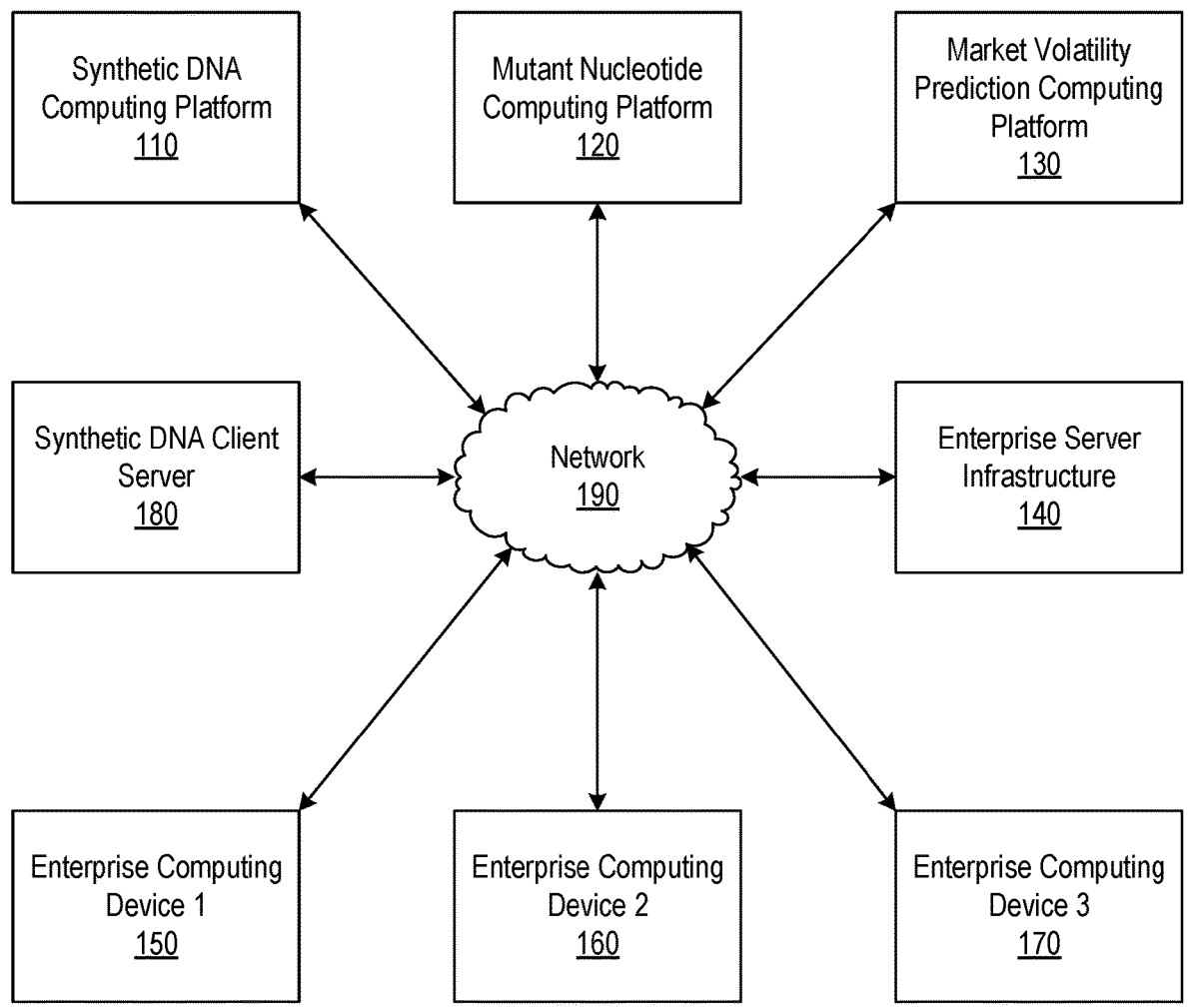
FIGS. 1A-1D depict an illustrative computing environment for using synthetic DNA stranding and mutant nucleotide processes to conduct enterprise market volatility predictions in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The systems and methods described herein may employ synthetic deoxyribonucleic acids (DNA) capsules holding enterprise level market data. In this regard, synthetic DNA may provide modern storage units capable of storing and processing large amounts of data, e.g., on the order of terabytes of data storage. The ability to store and retrieve digital information within synthetic DNA such as synthetic DNA cells or capsules may allow for a low-cost, high-density storage medium for digital data.

As a brief introduction to the concepts described further herein, one or more aspects of the disclosure provide systems and methods to efficiently and effectively implement synthetic DNA stranding and mutant nucleotide processes to conduct enterprise market volatility predictions. Synthetic DNA computing may generally involve encoding and decoding binary data to and from synthesized strands of DNA to provide high density data storage formatting. For example, one or more of the systems and methods described herein are directed towards processing enterprise market data into synthetic DNA stranded data suitable for input to market volatility prediction models in accordance with one or more example embodiments. Further, one or more of the systems and methods described herein are directed towards using mutant nucleotide processes to validate enterprise market data as input for market volatility prediction models. Still further, one or more of the systems and methods described herein are directed towards conducting enterprise market volatility testing on synthetic DNA stranded market data. In one or more instances, a set of instructions may be converted to a mutant nucleotide sequence which is subsequently inserted into the synthetic DNA stranded data to extract validate information in the synthetic DNA stranded data. In one or more instances, synthetic DNA stranded market data may be run though a market volatility model. In these instances, results from the market volatility model may be include one or more market volatility forecasting parameters, which are compiled and displayed on a market application interface.

In some instances, a bi-layered approach may be employed in which (a) market data is converted through long short-term memory (LSTM) into synthetic DNA capsules with a DNA stranding process and (b) once the data is stored in synthetic DNA capsules, mutant nucleotides may be injected into the synthetic DNA capsules to validate the market data and identify potential anomalies. During the DNA stranding process, synthetic DNA capsules may be stored on a synthetic DNA client server, where a synthetic DNA client may include a folder-like infrastructure configured to accommodate synthetic DNA capsules. During the mutant injection process, mutants may be equipped with validation rules called mutant nucleotides configured for validating the market data and identifying potential anomalies.

According to these examples, synthetic DNA may be used in the financial space to enable market volatility data validation and forecasting. In this regard, synthetic DNA capsules may be capable of storing the enterprise market data in a DNA form. Accordingly, such synthetic DNA may be capable of handling market volatility data in a centralized way at an enterprise level. According to examples described herein, synthetic DNA may be leveraged to hold enterprise level market data using synthetic DNA capsules.

Accordingly, described herein are systems and methods for gathering large data sets that may affect market volatility, e.g., from a plurality of lines of business across an enterprise and containing market information, and compressing and storing these data sets using synthetic DNA stranding. Systems and methods described herein may receive market data from a plurality of lines of business across an enterprise in a raw, uncompressed format, assimilate the market data into one or more market data clusters, preprocess the one or more market data clusters through at least one vectoring process to output vectored market data, perform a synthetic DNA stranding process on the vectored market data to create one or more strands of synthetic DNA market data, and output the one or more strands of synthetic DNA market data to a synthetic DNA client server, where the one or more stands of synthetic DNA market data is configured for input in a market volatility prediction model.

Also described herein are systems and methods for preprocessing and analyzing compressed synthetic DNA stranded data using mutant nucleotides that apply rules to the compressed synthetic DNA stranded data. The systems and methods may initiate a set of instructions associated with performing an action on a synthetic DNA market data set that includes market data associated with a plurality of lines of business across an enterprise organization, convert the set of instructions to a mutant nucleotide sequence, insert the mutant nucleotide sequence into the synthetic DNA market data set, extract target information from the synthetic DNA market data set using the mutant nucleotide sequence, validate the target information by applying validation rules to the target information and analyzing the target information to detect one or more anomalies, remove detected anomalies to form a validated synthetic DNA market data set, and output the validated synthetic DNA market data set to a synthetic DNA client server, where the synthetic DNA client server is configured to input the validated synthetic DNA market data set into a market volatility prediction model.

Also described herein are systems and methods for performing enterprise volatility forecasting using market volatility prediction models on synthetic DNA stranded market data. The systems and methods may receive raw market data from a plurality of lines of business of an enterprise organization, preprocess the raw market data to obtain enterprise level market data, execute synthetic DNA stranding of the enterprise level market data to obtain synthetic DNA stranded market data, run the synthetic DNA stranded market data through one or more market volatility models, compile results from the one or more market volatility models on the synthetic DNA stranded market data, and transmit, via the communication interface, results from the one or more market volatility models on the synthetic DNA stranded market data for display on a market application interface that includes one or more market volatility forecasting parameters based on results of the one or more market volatility models.

FIGS. 1A-1D depict an illustrative computing environment that uses synthetic DNA stranding and mutant nucleotide processes to conduct enterprise market volatility predictions in accordance with one or more example embodiments. Referring to FIG. 1A, computing environment 100 may include one or more devices (e.g., computer systems, communication devices, servers). For example, computing environment 100 may include a synthetic DNA computing platform 110, a mutant nucleotide computing platform 120, a market volatility prediction computing platform 130, an enterprise server infrastructure 140, a first enterprise computing device 150, a second enterprise computing device 160, a third enterprise computing device 170, and a synthetic DNA client server 180.

As described further below, synthetic DNA computing platform 110 may be a computer system that includes one or more computing devices (e.g., servers, server blades, or the like) and/or other computer components (e.g., processors, memories, communication interfaces) that may be used to implement process automation, machine learning algorithms, artificial intelligence, or the like to process market data and generate synthetic DNA stranded market data using synthetic DNA stranding processing to create input market data for conducting enterprise market volatility predictions accordingly. In some instances, the synthetic DNA computing platform 110 may be maintained by an enterprise organization (e.g., a financial institution, or the like) and may be configured to receive process step information relating to one or more enterprise market data processes and market data information relating to data from a plurality of lines of business in an enterprise organization, receive and preprocess enterprise market data, and create synthetic DNA stranded market data. In some instances, the synthetic DNA computing platform 110 may be configured to assimilate the market data into one or more market data clusters, preprocess the one or more market data clusters through at least one vectoring process to output vectored market data, and perform a synthetic DNA stranding process on the vectored market data to create one or more strands of synthetic DNA market data.

Mutant nucleotide computing platform 120 may be a computer system that includes one or more computing devices (e.g., servers, server blades, or the like) and/or other computer components (e.g., processors, memories, communication interfaces) that may be used to implement process automation, machine learning algorithms, artificial intelligence, or the like to validate and apply corrections to synthetic DNA stranded market data to create input market data for conducting enterprise market volatility predictions accordingly. In some instances, the mutant nucleotide computing platform 120 may be maintained by an enterprise organization (e.g., a financial institution, or the like) and may be configured to convert the set of instructions to a mutant nucleotide sequence, insert the mutant nucleotide sequence into the synthetic DNA market data set, and extract target information from the synthetic DNA market data set using the mutant nucleotide sequence. In some instances, the mutant nucleotide computing platform 120 may be configured to apply validation rules to extracted synthetic DNA data, and identify and remove one or more data anomalies to form a validated synthetic DNA market data set.

Market volatility prediction computing platform 130 may be a computer system that includes one or more computing devices (e.g., servers, server blades, or the like) and/or other computer components (e.g., processors, memories, communication interfaces) that may be used to implement process automation, machine learning algorithms, artificial intelligence, or the like to process synthetic DNA stranded market data through one or more enterprise market volatility prediction models for conducting enterprise market volatility predictions accordingly. In some instances, the market volatility prediction computing platform 130 may be maintained by an enterprise organization (e.g., a financial institution, or the like) and may be configured to run synthetic DNA stranded market data through one or more market volatility models and compile results from the one or more market volatility models on the synthetic DNA stranded market data. In some instances, the market volatility prediction computing platform 130 may be configured to provide results from the one or more market volatility models on the synthetic DNA stranded market data for display to a user.

Enterprise server infrastructure 140 may include one or more computing devices and/or other computer components (e.g., processors, memories, communication interfaces). In addition, and as illustrated in greater detail below, enterprise server infrastructure 140 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which enterprise server infrastructure 140 may be deployed.

In some arrangements, enterprise server infrastructure 140 may include a server, server blade, or the like configured to host an enterprise service (e.g., a mobile banking application, ATM service, or the like). In one or more instances, the enterprise server infrastructure 140 may be configured to communicate with enterprise computing devices (e.g., first enterprise computing device 150, second enterprise computing device 160, third enterprise computing device 170, or the like) to process applications based on various parameters and user inputs received at enterprise computing devices 150, 160, 170. In some instances, the enterprise server infrastructure 140 may be configured to cause display (e.g., at first enterprise computing device 150, second enterprise computing device 160, third enterprise computing device 170, or the like), of a particular user interface based on information received from the synthetic DNA computing platform 110, the mutant nucleotide computing platform 120, and/or the market volatility prediction computing platform 130.

First enterprise computing device 150 may include one or more computing devices and/or other computer components (e.g., processors, memories, communication interfaces). In addition, and as illustrated in greater detail below, first enterprise computing device 150 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which first enterprise computing device 150 may be deployed.

In some arrangements, first enterprise computing device 150 may be a desktop computer, laptop computer, tablet, mobile device, or the like, and may be used by an individual such as a client or employee of an enterprise organization (e.g., a financial institution, or the like). For example, first enterprise computing device 150 may be configured to communicate with enterprise server infrastructure 140 to facilitate display of user interfaces (e.g., interfaces that generate a report of parameters associated with the completion of market forecast applications, synthetic DNA stranding processes, mutant nucleotide data validation processes, or the like) based on received information.

In some arrangements, first enterprise computing device 150 may be linked to and/or used by one or more enterprise users (who may, e.g., be employees of an enterprise organization operating the enterprise center where first enterprise computing device 150 is deployed and/or used). For instance, first enterprise computing device 150 may be deployed at an enterprise center, such as the enterprise center where enterprise server infrastructure 140 is deployed, so that first enterprise computing device 150 may be used by one or more employees of an enterprise organization operating the enterprise center. For example, first enterprise computing device 150 may store and/or execute one or more enterprise applications, such as account creation and management applications, transaction history applications, lending applications, brokerage applications, and/or other applications, which may be used by the one or more enterprise users of first enterprise computing device 150.

Second enterprise computing device 160 may include one or more computing devices and/or other computer components (e.g., processors, memories, communication interfaces). In addition, and as illustrated in greater detail below, second enterprise computing device 160 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which second enterprise computing device 160 may be deployed.

In some arrangements, second enterprise computing device 160 may be a desktop computer, laptop computer, tablet, mobile device, or the like, and may be used by an individual such as a client or employee of an enterprise organization (e.g., a financial institution, or the like). For example, second enterprise computing device 160 may be configured to communicate with enterprise server infrastructure 140 to facilitate display of user interfaces (e.g., interfaces that generate a report of parameters associated with the completion of market forecast applications, synthetic DNA stranding processes, mutant nucleotide data validation processes, or the like) based on received information.

In some arrangements, second enterprise computing device 160 may be linked to and/or used by one or more enterprise users (who may, e.g., be employees of an enterprise organization operating the enterprise center where second enterprise computing device 160 is deployed and/or used). For instance, second enterprise computing device 160 may be deployed at an enterprise center, such as the enterprise center where enterprise server infrastructure 140 is deployed, so that second enterprise computing device 160 may be used by one or more employees of an enterprise organization operating the enterprise center. For example, second enterprise computing device 160 may store and/or execute one or more enterprise applications, such as account creation and management applications, transaction history applications, lending applications, brokerage applications, and/or other applications, which may be used by the one or more enterprise users of second enterprise computing device 160.

Third enterprise computing device 170 may include one or more computing devices and/or other computer components (e.g., processors, memories, communication interfaces). In addition, and as illustrated in greater detail below, third enterprise computing device 170 may be configured to receive information from, send information to, and/or otherwise exchange information with one or more devices that are physically present at and/or within a certain range of an enterprise location (e.g., a banking center, a financial services center, an automated teller machine vestibule, or another enterprise location) at which third enterprise computing device 170 may be deployed.

In some arrangements, third enterprise computing device 170 may be a desktop computer, laptop computer, tablet, mobile device, or the like, and may be used by an individual such as a client or employee of an enterprise organization (e.g., a financial institution, or the like). For example, third enterprise computing device 170 may be configured to communicate with enterprise server infrastructure 140 to facilitate display of user interfaces (e.g., interfaces that generate a report of parameters associated with the completion of market forecast applications, synthetic DNA stranding processes, mutant nucleotide data validation processes, or the like) based on received information.

In some arrangements, third enterprise computing device 170 may be linked to and/or used by one or more enterprise users (who may, e.g., be employees of an enterprise organization operating the enterprise center where third enterprise computing device 170 is deployed and/or used). For instance, third enterprise computing device 170 may be deployed at an enterprise center, such as the enterprise center where enterprise server infrastructure 140 is deployed, so that third enterprise computing device 170 may be used by one or more employees of an enterprise organization operating the enterprise center. For example, third enterprise computing device 170 may store and/or execute one or more enterprise applications, such as account creation and management applications, transaction history applications, lending applications, brokerage applications, and/or other applications, which may be used by the one or more enterprise users of third enterprise computing device 170.

Synthetic DNA client server 180 may include one or more computing devices and/or other computer components (e.g., processors, memories, communication interfaces). In addition, synthetic DNA client server 180 may be configured to receive, store, transmit, and/or otherwise provide synthetic DNA stranded market data (which may, e.g., be provided for input to a market volatility prediction application). In some instances, the mutant nucleotide sequences initiated by the mutant nucleotide computing platform 120 may be inserted into synthetic DNA stranded data on the synthetic DNA client server 180 for processing, data validation, and/or anomaly removal from the synthetic DNA stranded data, as will be described in greater detail below.

Computing environment 100 also may include one or more networks, which may interconnect synthetic DNA computing platform 110, mutant nucleotide computing platform 120, market volatility prediction computing platform 130, enterprise server infrastructure 140, first enterprise computing device 150, second enterprise computing device 160, third enterprise computing device 170, synthetic DNA client server 180, or the like. For example, computing environment 100 may include a network 190 (which may interconnect, e.g., synthetic DNA computing platform 110, mutant nucleotide computing platform 120, market volatility prediction computing platform 130, enterprise server infrastructure 140, first enterprise computing device 150, second enterprise computing device 160, third enterprise computing device 170, synthetic DNA client server 180, and/or one or more other systems which may be associated with an enterprise organization, such as a financial institution, with one or more other systems, public networks, sub-networks, and/or the like).

In one or more arrangements, synthetic DNA computing platform 110, mutant nucleotide computing platform 120, market volatility prediction computing platform 130, enterprise server infrastructure 140, first enterprise computing device 150, second enterprise computing device 160, third enterprise computing device 170, and synthetic DNA client server 180 may be any type of computing device capable of sending and/or receiving workload data and processing the workloads accordingly. For example, synthetic DNA computing platform 110, mutant nucleotide computing platform 120, market volatility prediction computing platform 130, enterprise server infrastructure 140, first enterprise computing device 150, second enterprise computing device 160, third enterprise computing device 170, synthetic DNA client server 180, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of synthetic DNA computing platform 110, mutant nucleotide computing platform 120, market volatility prediction computing platform 130, enterprise server infrastructure 140, first enterprise computing device 150, second enterprise computing device 160, third enterprise computing device 170, and synthetic DNA client server 180 may, in some instances, be special-purpose computing devices configured to perform specific functions. Further, while illustrated as separate components in FIG. 1A, any combination of synthetic DNA computing platform 110, mutant nucleotide computing platform 120, market volatility prediction computing platform 130, enterprise server infrastructure 140, first enterprise computing device 150, second enterprise computing device 160, third enterprise computing device 170, and synthetic DNA client server 180 may be provided together on a common computing device.

As illustrated in greater detail below, synthetic DNA computing platform 110 may include one or more computing devices configured to perform one or more of the functions described herein. For example, synthetic DNA computing platform 110 may include one or more computers (e.g., laptop computers, desktop computers, servers, server blades, or the like).

Figure 1B:
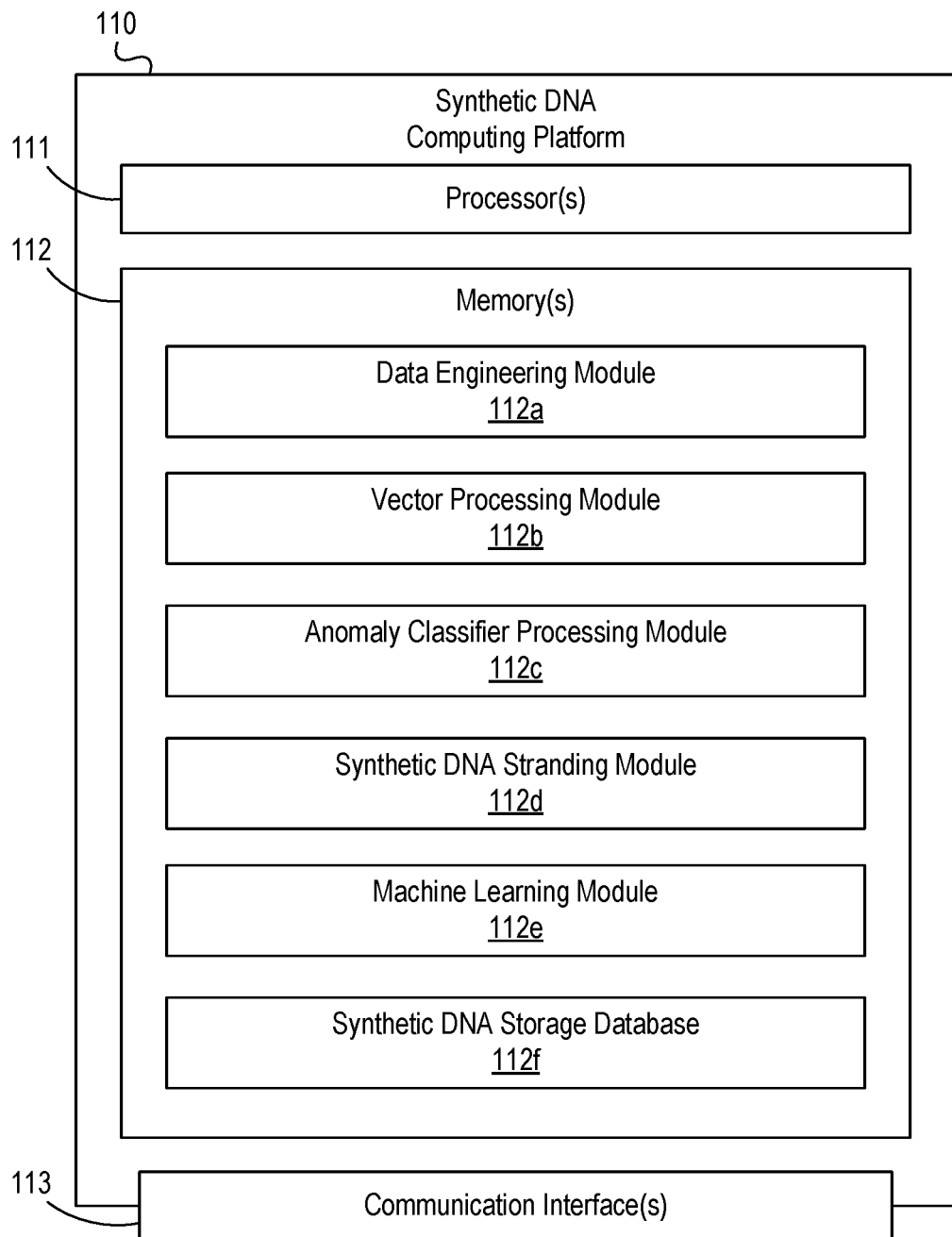

Referring to FIG. 1B, synthetic DNA computing platform 110 may include one or more processors 111, memory 112, and communication interface 113. A data bus may interconnect processor 111, memory 112, and communication interface 113. Communication interface 113 may be a network interface configured to support communication between synthetic DNA computing platform 110 and one or more networks (e.g., network 190, or the like). Memory 112 may include one or more program modules having instructions that when executed by processor 111 cause synthetic DNA computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of synthetic DNA computing platform 110 and/or by different computing devices that may form and/or otherwise make up synthetic DNA computing platform 110. For example, memory 112 may have, host, store, and/or include data engineering module 112*a*, vector processing module 112*b*, anomaly classifier processing module 112*c*, synthetic DNA stranding module 112*d*, machine learning module 112*e*, and synthetic DNA storage database 112*f*.

Data engineering module 112*a* may have instructions that direct and/or cause synthetic DNA computing platform 110 to execute data engineering and/or data assimilation processes as described herein, e.g., assimilating and consolidating raw, uncompressed data and/or performing data prefetch processing. Vector processing module 112*b* may have instructions that direct and/or cause synthetic DNA computing platform 110 to preprocess market data through one or more data vectoring processes, e.g., feature vectoring processes, temporal vectoring processes, and/or anomaly vectoring processes, as discussed in greater detail below. Anomaly classifier processing module 112*c* may have instructions that direct and/or cause anomaly classifier processing module 112*c* to identify and remove one or more anomalies in processed market data, as discussed in greater detail below. Synthetic DNA stranding module 112*d* may have instructions that direct and/or cause the synthetic DNA computing platform 110 to set, define, direct and/or cause a synthetic DNA stranding process to run of processed market data in accordance with process input rules and/or other parameters used by the synthetic DNA computing platform 110 and/or other systems in computing environment 100. Machine learning module 112*e* may have instructions that direct and/or cause the synthetic DNA computing platform 110 to set, define, and/or iteratively refine rules and/or other parameters used by the synthetic DNA computing platform 110 and/or other systems in computing environment 100. Synthetic DNA storage database 112*f* may store information used by synthetic DNA stranding module 112*d* and/or synthetic DNA computing platform 110 in application of synthetic DNA preprocessing and stranding techniques related to performing synthetic DNA stranding on market data for input into enterprise market volatility prediction models.

As illustrated in greater detail below, mutant nucleotide computing platform 120 may include one or more computing devices configured to perform one or more of the functions described herein. For example, mutant nucleotide computing platform 120 may include one or more computers (e.g., laptop computers, desktop computers, servers, server blades, or the like).

Figure 1C:
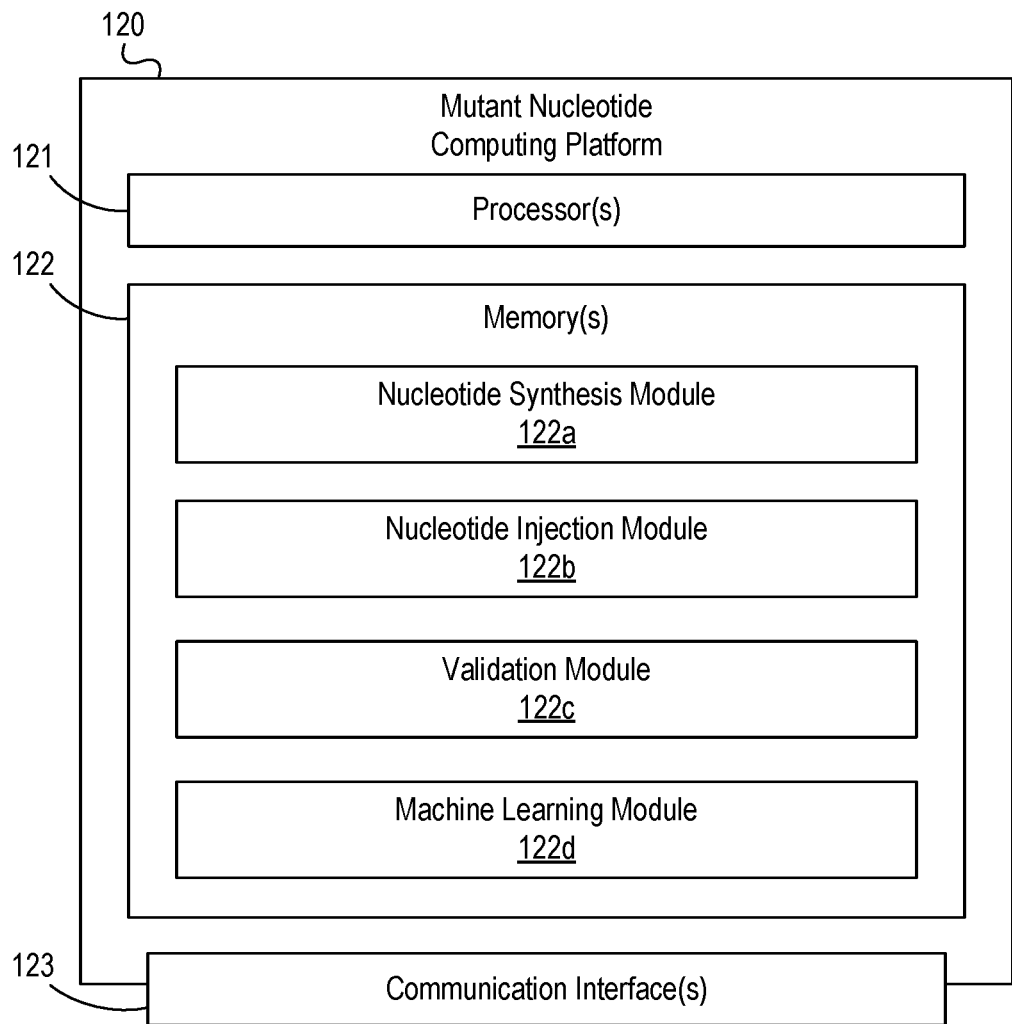

Referring to FIG. 1C, mutant nucleotide computing platform 120 may include one or more processors 121, memory 122, and communication interface 123. A data bus may interconnect processor 121, memory 122, and communication interface 123. Communication interface 123 may be a network interface configured to support communication between mutant nucleotide computing platform 120 and one or more networks (e.g., network 190, or the like). Memory 122 may include one or more program modules having instructions that when executed by processor 121 cause mutant nucleotide computing platform 120 to perform one or more functions described herein and/or one or more databases that may store and/or otherwise maintain information which may be used by such program modules and/or processor 121. In some instances, the one or more program modules and/or databases may be stored by and/or maintained in different memory units of mutant nucleotide computing platform 120 and/or by different computing devices that may form and/or otherwise make up mutant nucleotide computing platform 120. For example, memory 122 may have, host, store, and/or include nucleotide synthesis module 122*a*, nucleotide injection module 122*b*, validation module 122*c*, and machine learning module 122*d*.

Nucleotide synthesis module 122*a* may have instructions that direct and/or cause mutant nucleotide computing platform 120 to convert a set of instructions into a mutant nucleotide sequence, as discussed in greater detail below. Nucleotide injection module 122*b* may have instructions that direct and/or cause mutant nucleotide computing platform 120 to insert a mutant nucleotide sequence into synthetic DNA stranded market data, e.g., stored on synthetic DNA client server 180, to carry out the set of instructions on the synthetic DNA market data. Validation module 122c may have instructions that direct and/or cause the mutant nucleotide computing platform 120 to set, define, direct and/or cause data validation on synthetic DNA market data as extracted by the mutant nucleotide sequence. Machine learning module 122d may have instructions that direct and/or cause the mutant nucleotide computing platform 120 to set, define, and/or iteratively refine rules and/or other parameters used by the mutant nucleotide computing platform 120 and/or other systems in computing environment 100 in the use of mutant nucleotides on synthetic DNA stranded market data.

As illustrated in greater detail below, market volatility prediction computing platform 130 may include one or more computing devices configured to perform one or more of the functions described herein. For example, market volatility prediction computing platform 130 may include one or more computers (e.g., laptop computers, desktop computers, servers, server blades, or the like).

Figure 1D:
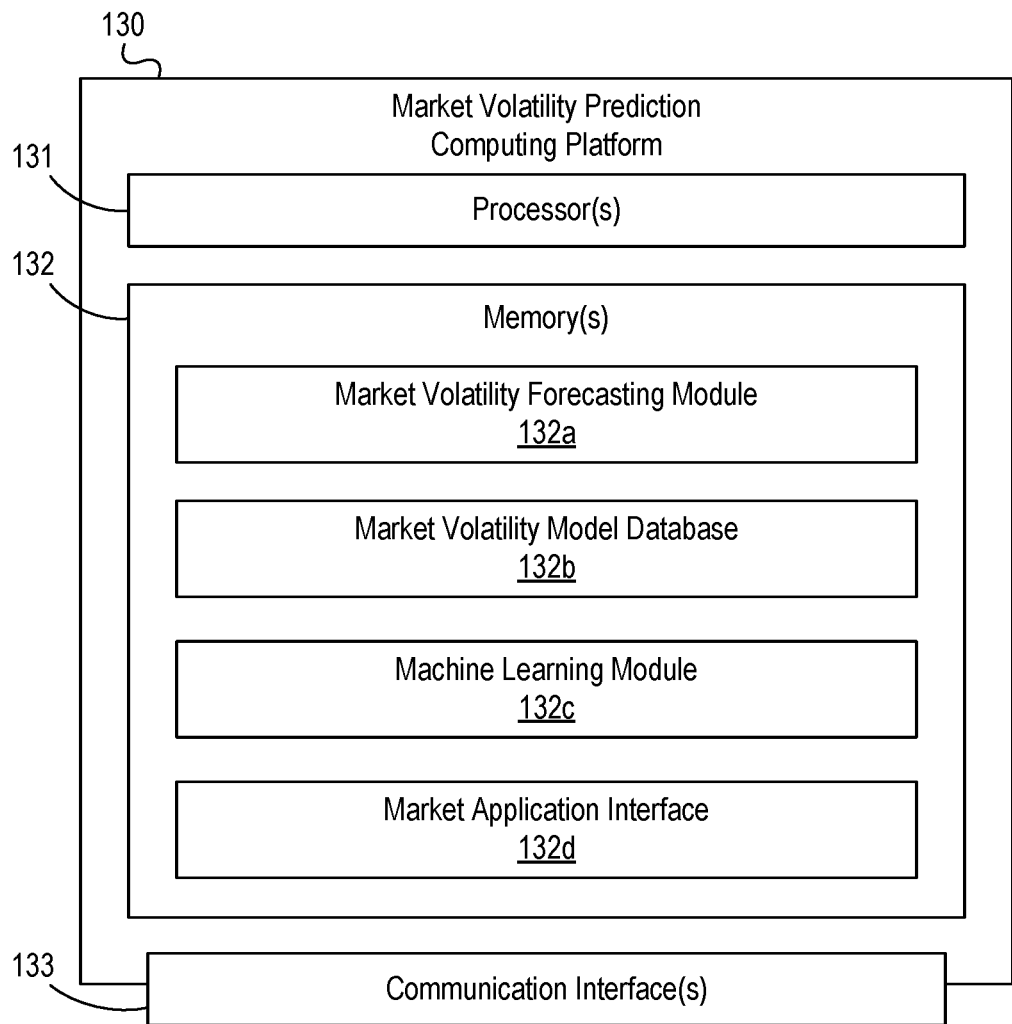

Referring to FIG. 1D, market volatility prediction computing platform 130 may include one or more processors 131, memory 132, and communication interface 133. A data bus may interconnect processor 131, memory 132, and communication interface 133. Communication interface 133 may be a network interface configured to support communication between market volatility prediction computing platform 130 and one or more networks (e.g., network 190, or the like). Memory 132 may include one or more program modules having instructions that when executed by processor 131 cause market volatility prediction computing platform 130 to perform one or more functions described herein and/or one or more databases that may store and/or otherwise maintain information which may be used by such program modules and/or processor 131. In some instances, the one or more program modules and/or databases may be stored by and/or maintained in different memory units of market volatility prediction computing platform 130 and/or by different computing devices that may form and/or otherwise make up market volatility prediction computing platform 130. For example, memory 132 may have, host, store, and/or include market volatility forecasting module 132a, market volatility model database 132b, machine learning module 132c, and market application interface 132d.

Market volatility forecasting module 132a may have instructions that direct and/or cause market volatility prediction computing platform 130 to execute market volatility forecasting models, e.g., using synthetic DNA stranded enterprise market data, as discussed in greater detail below. Market volatility model database 132b may store information and models used by market volatility forecasting module 132a and/or market volatility prediction computing platform 130 in application of enterprise market volatility predictions using synthetic DNA stranded enterprise market data, and/or in performing other related functions for processing and maintaining market volatility forecasting models and related resources. Machine learning module 132c may have instructions that direct and/or cause the market volatility prediction computing platform 130 to set, define, and/or iteratively refine optimization rules and/or other parameters used by the market volatility prediction computing platform 130 and/or other systems in computing environment 100. Market application interface 132d may have instructions that direct and/or cause the synthetic DNA computing platform 110 to set, define, direct and/or cause a display of an interface relating to selection of various market volatility forecasting models and related inputs for a particular enterprise market data set and/or relating to the compilation of results from execution of a market volatility forecasting model on a set of synthetic DNA stranded enterprise market data used by the market volatility prediction computing platform 130 and/or other systems in computing environment 100.

Accordingly, by performing the one or more methods described herein, one or more technical advantages may be realized. For example, one technical advantage of using synthetic DNA computing techniques on enterprise market data is that such techniques may optimize computing resources, and may process forecasting models more accurately. This approach may allow for the completion of a number of market volatility forecasting models in a more efficient and timely manner. Furthermore, one or more of the systems and methods described herein may improve computing resource capacity at one or more computing systems by reducing an amount of computing resources used for storing and processing such enterprise market data. Similarly, the systems and methods described herein may conserve network bandwidth by reducing communications between enterprise devices in the processing and completion of various market volatility forecasting models.

In the systems and methods described herein, synthetic DNA computing techniques may be used on enterprise market data for the purpose of enterprise market volatility forecasting. In these examples, input data at an enterprise level from a plurality of lines of business may be received at a computing platform. The input data may be processed through one or more data engineering or data assimilation processes, which may generally include pulling data sets from multiple lines of business, e.g., from an enterprise data pipeline, into an enterprise level data set.

Vectored data from the one or more vectoring processes involved in preprocessing of the market data may be provided as input, e.g., in the form of integrated gradients, for synthetic DNA stranding. In such examples, synthetic DNA stranding may include receiving preprocessed vector data to transform into synthetic DNA stranded data as transferred to a DNA client server, as will be described in more detail below.

Figure 2D:
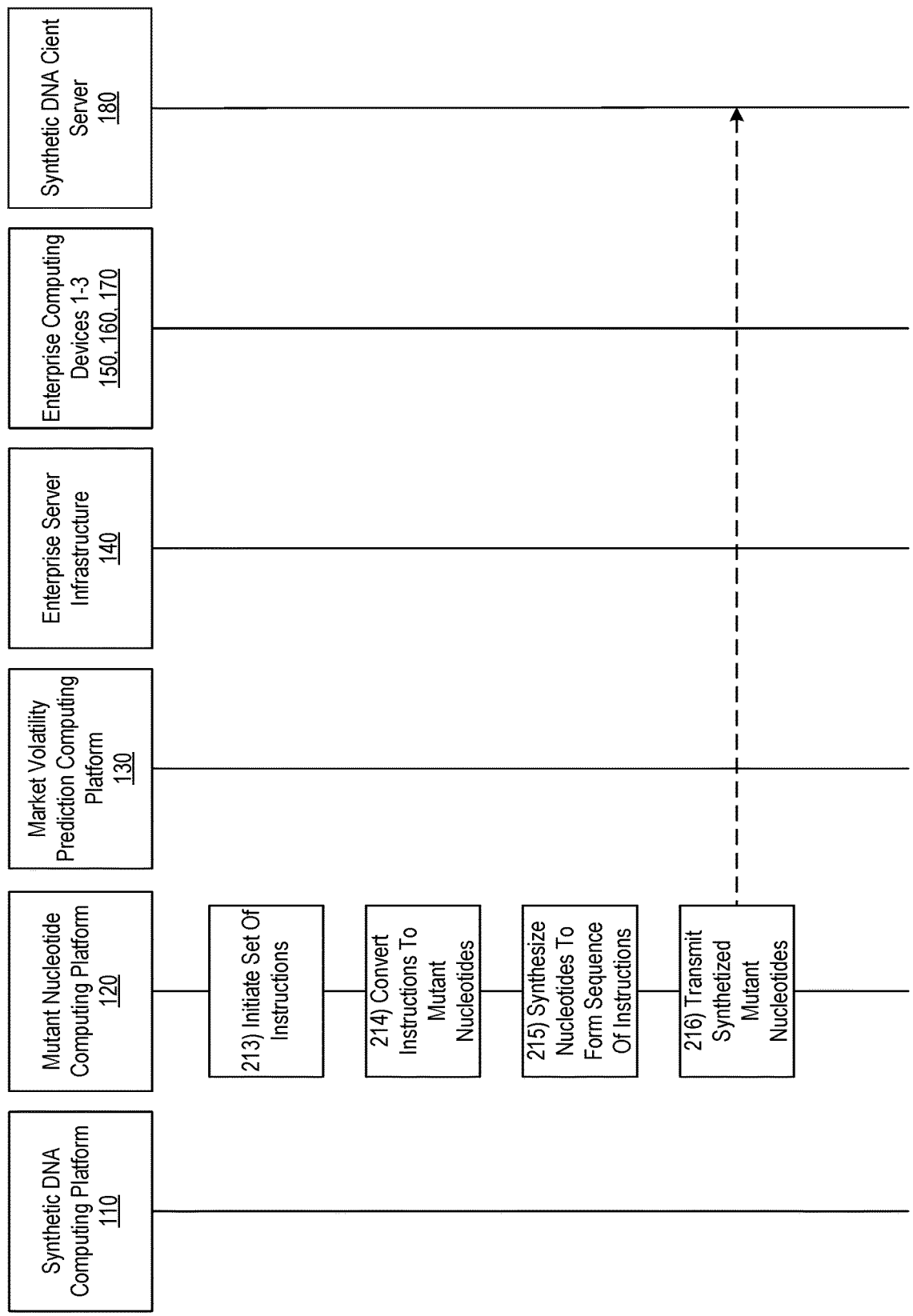

FIGS. 2A-2H depict an illustrative event sequence for using synthetic DNA stranding and mutant nucleotide processes to conduct enterprise market volatility predictions in accordance with one or more example embodiments. Referring to FIG. 2A, at step 201, synthetic DNA computing platform 110 may receive input data from a plurality of lines of business of an enterprise. For example, one or more enterprise computing devices, such as first enterprise computing device 150, second enterprise computing device 160, and/or third enterprise computing device 170, may transmit the input data to the synthetic DNA computing platform 110. In some instances, the input data may be sent by the enterprise server infrastructure 140 and/or other enterprise computing devices within computing environment 100. The input data may include a variety of enterprise information, including, but not limited to workforce information, technology inputs, and process inputs, which relate to various aspects of an enterprise organization.

For example, at step 201, synthetic DNA computing platform 110 may receive, via the communication interface (e.g., communication interface 113), from one or more data source computer systems (e.g., from enterprise server infrastructure 140, first enterprise computing device 150, second enterprise computing device 160, and/or third enterprise computing device 170, and/or one or more other data sources), raw market data associated with an enterprise organization. The raw market data may, for instance, include event data, transaction data, and/or activity data that is transmitted by and/or received from internal event feeds (e.g., feeds originating from sources within the enterprise organization), external event feeds (e.g., feeds originating from sources outside of the enterprise organization), internal enterprise systems (e.g., systems within the enterprise organization), external enterprise systems (e.g., systems outside of the enterprise organization), and/or other sources. The event data may, for instance, identify specific events occurring as part of a given process. The transaction data may, for instance, identify specific transactions being conducted on accounts as part of a given process. The activity data may, for instance, identify specific activity occurring as part of a given process.

At step 202, the synthetic DNA computing platform 110 may consolidate and assimilate the raw input data into an enterprise-level market data set. For example, the raw market data received at step 201 may have been received from a plurality of sources, such as the enterprise server infrastructure 140, first enterprise computing device 150, second enterprise computing device 160, and/or third enterprise computing device 170, and/or one or more other data source, which may each provide raw input data in a particular format. The data consolidation and assimilation may be performed by a process running on data engineering module 112a. In some examples, step 202 may occur automatically upon receipt of any input data at step 201. In other examples, step 202 may occur upon the synthetic DNA computing platform 110 receiving a requisite amount of raw input data. In some examples, step 202 may occur upon receiving a user instruction, e.g., at an input device of the synthetic DNA computing platform 110 or from another computing device, such as first enterprise computing device 150, second enterprise computing device 160, and/or third enterprise computing device 170. The synthetic DNA computing platform 110 may accordingly proceed within various data assimilation processes, as will be described in greater detail below.

Data assimilation processing at step 202 may include assimilating raw, uncompressed data received from the enterprise data pipeline, and consolidate the raw data, e.g., into one or more Hadoop clusters. Consolidating the raw data into one or more Hadoop clusters may include processing the data into computational clusters designed specifically for storing and analyzing large amounts of unstructured data in a distributed computing environment associated with the synthetic DNA computing platform 110. Such clusters may be created using suitable distributed processing software. Hadoop clustering may include use of various open-source software utilities that facilitate using a network of computing devices to cluster large amounts of data for use in subsequent computations and analyses. As such, Hadoop clustering may provide a computing framework for distributed storage and processing of large data sets, such as enterprise market data. In some examples, one computing module in the cluster may be designated as a name node platform and another computing module may be designated as a job tracker computing platform, while remaining modules involved in the clustering processing may act as data node and task tracker platforms. In such examples, the nodes may be connected by a network, but otherwise share no information therebetween.

Clustering the input data at step 202 may boost the speed of various data analysis applications, such as market volatility forecasting applications. Clustering data processing may also be highly scalable. Accordingly, if a processing power associated with the synthetic DNA computing platform 110 is overwhelmed by expanding volumes of data, additional cluster nodes may be added to increase throughput. Clustering data processing may also be highly resistant to failure because each piece of data is copied onto other cluster nodes, ensuring that no data is lost if one node fails. After clustering the data, the clustered data may be stored in a distributed file system associated with the synthetic DNA computing platform 110. In consolidating the raw data into Hadoop clusters, the raw input data may be split into large blocks and distributed across nodes in a cluster. The data in the clusters may then be processed in parallel by the data engineering module 112a, e.g., by transfer of a code onto the node. Such clustering may provide a configuration where nodes only manipulate data to which they have access. This configuration may thus provide faster and more efficient data processing than conventional parallel file systems where computations and data are distributed across a network.

At step 203, the synthetic DNA computing platform 110 may run a prefetch process on the consolidated raw input data. For example, the synthetic DNA computing platform 110 may choose one or more algorithms, define parameters, and the like, for the prefetch process. The machine learning module 112e may be configured based on various classifications and/or regression models, such as neural networks, decisions trees, decisions forests, standard linear regressions, Bayesian regressions, and other algorithms, for selection or setup of the prefetch process.

The prefetch process at step 203 may be data engineering processing in which the consolidated raw input data is split into a plurality of batches. At step 204, upon a first batch of data being processed, the data engineering module 112a may send the first batch for further processing and synthetic DNA stranding while a second batch of data is processed in parallel at the data engineering module 112a. In such examples, the data engineering module 112a may stay active in running prefetch processing while synthetic DNA stranding processing starts.

Referring to FIG. 2B, at step 205, synthetic DNA computing platform 110 may perform a feature vectoring process. Performing the feature vectoring process at step 205 may include transforming the data through vectoring processes to isolate effects or identify certain data features. The data input into the feature vectoring process at step 205 may include data that has been processed through one or more data engineering or data assimilation processes at step 202 and 204. The feature vectoring process may encode the market data and reconstruct the data to create a latent data representation and verify an accurate mathematical representation by a decoder.

In some examples, performing the feature vectoring process at step 205 may include encoding market data with long short-term memory (LSTM) and verifying an accurate mathematical representation may include decoding with LSTM. Long short-term memory (LSTM) encoding may include use of an artificial neural network architecture with feedforward and feedback connections to encode one or more sequences of market data. In some examples, LSTM encoding processes may provide anomaly detection based on various aspects of the raw market data. LSTM processes may also process time series data in a suitable format for classifying, processing, and making predictions, e.g., where there are time lags of unknown duration between events in a time series. In other examples, encoding the market data include encoding with recurrent neural networks, hidden Markov models or other types of sequence learning methods. In addition to using LSTM processes for encoding the market data, LSTM processes may also be used for decoding data. For example, a feature vectoring process may include encoding market data using an encoder LSTM process, reconstructing the data to provide a latent representation of the data, and decoding the encoded data by a decoder LSTM process to ensure an accurate mathematical representation.

At step 206, synthetic DNA computing platform 110 may perform a temporal vectoring process. The temporal vectoring process may process temporal aspects of the market data. For example, performing the temporal vectoring process may include using LSTM layers to concatenate temporal aspects of the market data into a series of vectors in accordance with the time-based features of the data. In performing the temporal vectoring process, synthetic DNA computing platform 110 may, for instance, obtain various input parameters associated with a current market data set that may relate to temporal aspects of the market data.

At step 207, synthetic DNA computing platform 110 may perform an anomaly vectoring process. The anomaly vectoring process may enable identification and removal of anomalies in the data. For example, the anomaly vectoring process may include applying a binary classification model to identify and remove anomalies. In some examples, anomalies may be identified related to the surrounding data. Machine learning may be involved in the training the synthetic DNA computing platform 110 to identify anomalies in market data.

For example, as part of step 207, after a machine learning model has been configured and trained, synthetic DNA computing platform 110 may receive information related to a current market data set, e.g., from enterprise server infrastructure 140, first enterprise computing device 150, second enterprise computing device 160, or third enterprise computing device 170. Information on the current market data set may be used in setting up and running the anomaly vectoring process. In receiving the information, synthetic DNA computing platform 110 may generate and/or send one or more commands directing enterprise server infrastructure 140, first enterprise computing device 150, second enterprise computing device 160, or third enterprise computing device 170 to capture various types of data relating to the current market data set.

At step 207, synthetic DNA computing platform 110 may apply a machine learning model to the market data received relating to a given enterprise volatility forecasting process. For instance, synthetic DNA computing platform 110 may apply the machine learning model to return one or more results indicating whether one or more anomalies are present in a current market data set (e.g., related to events, transactions, activity, or the like in a current market data set). In applying the machine learning model to a current market data set, synthetic DNA computing platform 110 may compute a score within the range of 0 to 1, where 0 represents generally non-anomalous data and 1 represents fully anomalous data, based on, e.g., surrounding data points, data set descriptors, corresponding features of the machine learning model, and the like.

In some embodiments, configuring the machine learning model to the market data from the one or more data source computer systems may include applying the machine learning model to process identification data received from an enterprise center system deployed at the enterprise center. For example, in training the machine learning model to the information received from the one or more data source computer systems (e.g., enterprise server infrastructure 140, first enterprise computing device 150, second enterprise computing device 160, third enterprise computing device 170), and in performing the anomaly vectoring process at step 207, synthetic DNA computing platform 110 may use the machine learning model to process identification data associated with market data received from an enterprise center system (e.g., enterprise server infrastructure 140) deployed at the enterprise center. For instance, the process identification data received from the enterprise center system (e.g., enterprise server infrastructure 140) deployed at the enterprise center may include a list of processes (e.g., process identifiers, process steps, process types, process resource requirements, and/or other process step properties) that are associated with a market data set currently present at and/or have been recently detected at the enterprise center.

At step 208, the synthetic DNA computing platform 110 may remove identified anomalies from the vectored market data. The anomalies removed at step 208 may be based on detecting anomalies from the anomaly vectoring process performed at step 208.

Referring to FIG. 2C, at step 209, the synthetic DNA computing platform 110 may transform vectored data to integrated gradients. For instance, at step 209, the vectored data may be the product of the vectoring processes performed at steps 205, 206, and 207, and/or with detected anomalies removed at step 208.

At step 210, the synthetic DNA computing platform 110 may form a set of synthetic DNA stranded data, e.g., from collected integrated gradient from step 210. For instance, at step 210, forming the set of synthetic DNA stranded data may include using various synthetic DNA computing routines as discussed herein to transform the preprocessed market data. As referred to herein, synthetic DNA processes employ DNA computing which uses DNA, biochemistry, and molecular biology hardware, instead of the traditional electronic computing. Such processes may allow for DNA digital data storage in which binary data may be encoded and decoded data to and from synthesized strands of DNA. An example of DNA computing may include immobilization of single stranded DNA on a solid support, polymerase chain reaction amplification of the sequences. Individual DNA bases with complementary bases may be tagged with fluorescent markers, where the fluorescence pattern, formed with a different color for each of the four DNA bases, may then be captured in an image and processed to determine a DNA sequence.

Synthetic DNA computing processes described herein may include a DNA computing process that executes an algorithm defined as a step-by-step list of instructions that takes and processes input, and produces a result. In a DNA computing process, information may be represented using the four-character genetic alphabet (A—adenine, G—guanine, C—cytosine, and T—thymine), rather than binary (1 and 0) used by traditional computing processes. Input to such an algorithm may be represented by DNA molecules with specific sequences, the instructions may be carried out by operations on the molecules (such as sorting according to length or chopping strands containing a certain subsequence), and the result may be defined as some property of the final set of molecules (such as the presence or absence of a specific sequence). The complementarity property of DNA—A and T stick together in pairwise fashion, as do G and C—may be employed for various data representations.

Synthetic DNA computing techniques may take advantage of various aspects of biochemistry-based information technology. Programmable information chemistry may build various types of biochemically-represented computing systems that may be capable of sensing their own surroundings, acting on decisions, and/or communicating with other similar forms. Various computations may be executed using a number of different building blocks (for example, simple molecular "machines" that use a combination of DNA and protein-based enzymes).

DNA sequences are known to appear in the form of double helices in living cells, in which one DNA strand is hybridized to its complementary strand through a series of hydrogen bonds. DNA computing is a based on the concept of performing logical and arithmetic operations using molecular properties of DNA by replacing traditional carbon or silicon chips with biochips. This allows massively parallel computation, where complex mathematical equations or problems may be solved at a much less time. With a considerable amount of synthetic computational DNA, computation is much more efficient than the traditional computer which would require significantly more hardware. The information or data, rather than being stored in binary digits will now be stored in the form of the bases A, T, G, C. The ability to synthesize short sequences of DNA artificially makes it possible to use these sequences as inputs for algorithms.

DNA computing takes advantage of the highly parallel nature of computation performed by DNA to solve problems that are difficult if not impossible to solve using the traditional methods. DNA computing may take advantage of the unique aspects of DNA but in the form of a digital data structure. DNA computing may involve allowing synthetic strands to hybridize in such a way as to perform computation. DNA computing may involve the self-assembly of the synthetic strands in such a way that hybridization occurs in a manner compatible with the goals of computation.

Clustering synthetic DNA data may involve deriving meaningful relationships in a complex collection of data by creating a structure using various concepts and algorithms. DNA-based clustering involves using strands to assign edges and vertices. Iterative calculations may be performed for every produced cluster to improve quality. Such clustering may be particularly useful when dealing with large heterogeneous data with an unknown number of clusters, such as enterprise-level market data, and may help in reducing the time and complexity in processing such data by taking advantage of the high parallelism features of DNA.

At step 211, synthetic DNA computing platform 110 may transmit the synthetic DNA stranded data to the synthetic DNA client server 180. For example, at step 211, synthetic DNA computing platform 110 may transmit the synthetic DNA stranded data in one or more batches, e.g., as each of a series of synthetic DNA processes is completed on a sequence of cluster of market data, upon completion of an entire batch of market data, upon a file size of transformed synthetic DNA stranded data on the synthetic DNA computing platform 110 reaching a requisite number, and the like.

At step 212, the synthetic DNA computing platform 110 may transmit a stranding process completion notification. For example, the stranding process completion notification transmitted at step 212 may be transmitted to the first enterprise computing device 150, the second enterprise computing device 160, the third enterprise computing device 170, or other enterprise computing system within the enterprise organization. Transmitting the stranding process completion notification at step 212 may include providing a display related to the current DNA stranding process and/or the related market data set. For example, at step 212, synthetic DNA computing platform 110 may generate one or more messages based on the completion of the DNA stranding process and may transmit the one or more messages to an enterprise computing device, such as the first enterprise computing device 150, the second enterprise computing device 160, the third enterprise computing device 170. The stranding process completion notification generated by synthetic DNA computing platform 110 may, for instance, include any and/or all of the information captured by synthetic DNA computing platform 110 in performing the synthetic DNA stranding process and related preprocessing.

Figure 3:
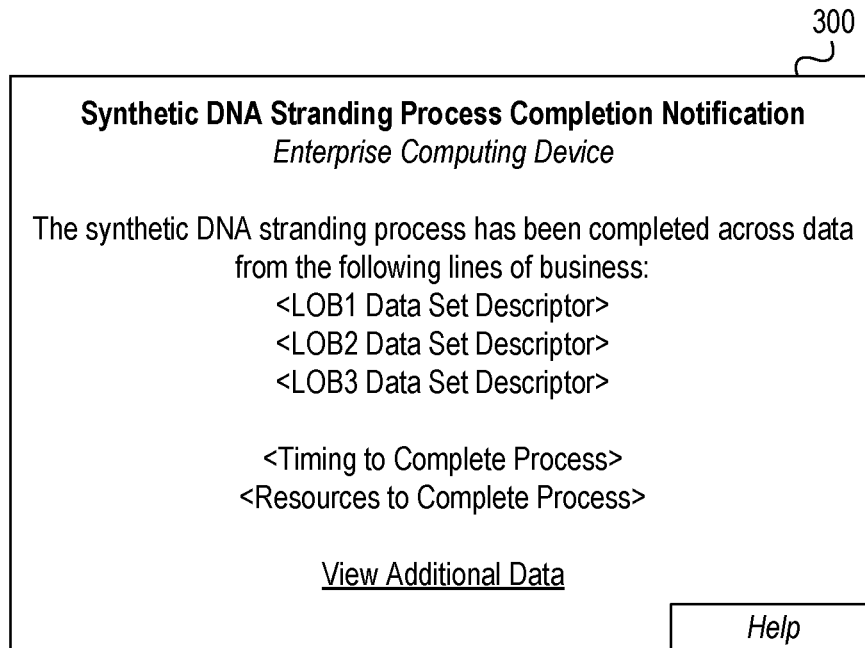
FIGS. 3-6 depict example graphical user interfaces relating to using synthetic DNA stranding and mutant nucleotide processes to conduct enterprise market volatility predictions in accordance with one or more example embodiments.

Additionally or alternatively, in providing the stranding process completion notification at step 212, synthetic DNA computing platform 110 may generate and/or send information to a device linked to an enterprise associate (e.g., the first enterprise computing device 150, the second enterprise computing device 160, the third enterprise computing device 170) which may cause the device to generate, display, and/or otherwise present a graphical user interface similar to graphical user interface 300, which is illustrated in FIG. 3. As seen in FIG. 3, graphical user interface 300 may include text and/or other information indicating that the current market data set has been processed through a synthetic DNA stranding process and providing an indication of resources associated with the synthetic DNA stranding process performed by the synthetic DNA computing platform 110 (e.g., timing to complete the synthetic DNA stranding process, resources used to complete the synthetic DNA stranding process, and the like), providing a description of the lines of business involved in the synthetic DNA stranding process, other data descriptors associated with market data involved in the synthetic DNA stranding process, and the like, as well as one or more user-selectable controls allowing the user of the enterprise associate (e.g., the first enterprise computing device 150, the second enterprise computing device 160, the third enterprise computing device 170) to view the additional data relating to the synthetic DNA stranding process and associated market data sets (e.g., "View Additional Data").

In the systems and methods described herein, mutant nucleotide computing techniques may be used on enterprise market data to conduct data validation for inputting the data into one or more enterprise market volatility forecasting models. In these examples, a set of instructions or rules may be initiated to be employed in the synthetic DNA space to perform a specific action. The set of instructions or rules may be written in any suitable coding language, such as C. The instructions may be converted to binary so as to translate to nucleotides. The nucleotides may include modules formed by pieces of code configured to interact with, process, and/or extract data from a larger synthetic DNA stranded set. A sequence of instructions may thus be synthesized and inserted into a mutant nucleotide.

One or more mutant nucleotides may be configured to conjugate into a synthetic DNA stranded data set, and to interact with, process, and/or extract data in accordance with the sequence of instructions. The one or more mutant nucleotides may the return results from the synthetic DNA stranded data set accordingly.

In some examples, the one or more mutant nucleotides may extract target information from the synthetic DNA stranded data set, e.g., related to validating market data in the synthetic DNA stranded data set. As such, the one or more mutant nucleotides may validate market data by extracting information from the synthetic DNA stranded data set, then compare the extracted information to one or more targets, and subsequently may transform the synthetic DNA stranded data set as appropriate in accordance with comparisons of the extracted information to one or more targets.

As described herein, processes employing mutant nucleotide computing techniques may provide an additional process for identifying anomalies in the market data that is inherent from a data distribution standpoint. For example, such techniques may identify a data component that is in an object form rather than a preferred numerical form and subsequently remove or modify such a data component.

Referring to FIG. 2D, at step 213, mutant nucleotide computing platform 120 may initiate a set of instructions or rules to perform a data validation process in the synthetic DNA space. For example, at step 213, mutant nucleotide computing platform 120 may receive, via a communication interface (e.g., communication interface 123), from one or more enterprise computer systems (e.g., enterprise server infrastructure 140, the first enterprise computing device 150, the second enterprise computing device 160, the third enterprise computing device 170), the set of instructions. Such instructions may include various input parameters and/or data validation routines suitable to set up and run a data validation routine on synthetic DNA stranded market data.

In some embodiments, the set of instructions initiated at step 213 may include instructions associated with performing an action on a synthetic DNA market data set that includes market data associated with a plurality of lines of business across an enterprise organization. The set of instructions may include instructions relating to one or more data validation processes for synthetic DNA stranded market data.

At step 214, mutant nucleotide computing platform 120 may convert the set of instructions to a sequence of mutant nucleotides. The sequence of mutant nucleotides may be configured to interact with, process, and/or extract data from a synthetic DNA stranded data set, synthetic DNA computing platform 110 may convert the set of instructions using transform algorithms associated with translating known software codes, e.g., in C, to mutant nucleotide sequences instructions.

At step 215, mutant nucleotide computing platform 120 may synthesize the sequence of mutant nucleotides to form a sequence of instructions to act on a set of synthetic DNA stranded data. For example, synthesizing the sequence of mutant nucleotides at step 215, mutant nucleotide computing platform 120 may compile a series of mutant nucleotides so as to be inserted into a synthetic DNA data set and to perform one or more action in the synthetic DNA data set, as will be described in more detail herein. At step 216, the mutant nucleotide synthesized at step 215 may be transmitted to a synthetic DNA client server 180.

Figure 2E:
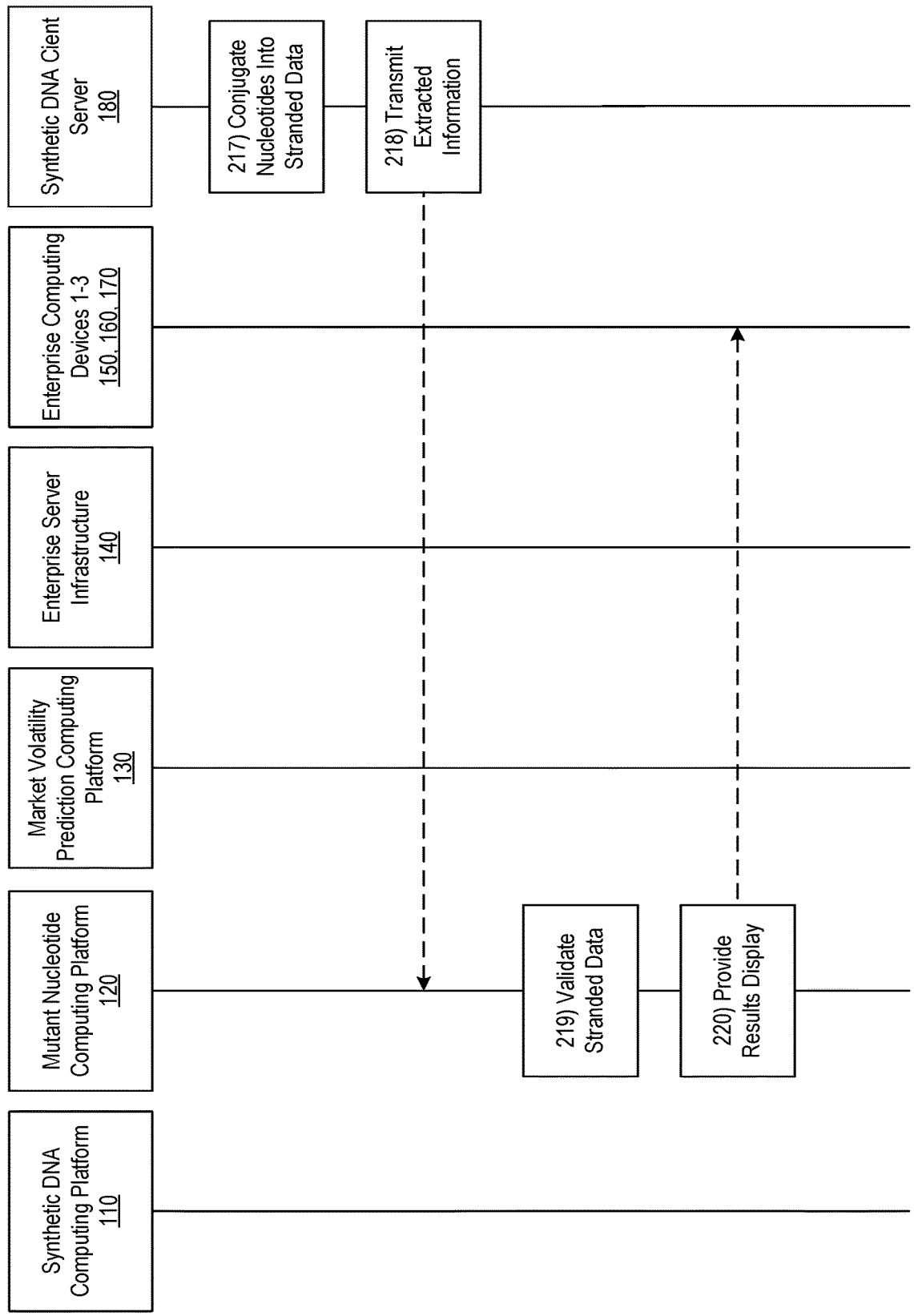

Now referring to FIG. 2E, at step 217, the synthetic DNA client server 180 may conjugate the synthesized mutant nucleotide sequence into the synthetic DNA stranded data. In some instances, the synthetic DNA client server 180 may host sequences of mutant nucleotides, and one or more of those sequences of mutant nucleotides may be inserted in the synthetic DNA stranded data at step 217.

At step 218, the synthetic DNA client server 180 may transmit extracted information to the mutant nucleotide computing platform 120. At step 218, the mutant nucleotide computing platform 120 may receive extracted target information from the synthetic DNA market data set (that is extracted using the mutant nucleotide sequence). In some examples, receiving the extracted target information may include conjugating the mutant nucleotide sequence into the synthetic DNA market data set and obtaining target information from the synthetic DNA market data set using the mutant nucleotide sequence, and transmitting the extracted information to the mutant nucleotide computing platform 120.

At step 219, the mutant nucleotide computing platform 120 may validate the synthetic DNA market data set. In some examples, validating synthetic DNA market data at step 219 may include applying validation rules to the extracted target information. In some examples, validating synthetic DNA market data at step 219 may include analyzing the extracted target information to detect one or more anomalies. In some examples, validating synthetic DNA market data at step 219 may include comparing the extracted target information to a baseline data structure and identifying the one or more anomalies based on comparing the extracted target information to the baseline data structure. In some examples, validating synthetic DNA market data at step 219 may include extracting a first component from the synthetic DNA market data set and a second component from the synthetic DNA market data set. The first component may be associated with data from a first line of business and the second component may be associated with data from a second line of business. The first component may then be compared to the second component to assess a difference in a data structure characteristic, and at least of portion of the first component may then be modified based on assessing a difference in the data structure characteristic of the first component relative to the second component. In some examples, validating synthetic DNA market data at step 219 may include extracting market volatility model input data from the extracted target information, and performing an input data check on the extracted market volatility model input data to validate the extracted market volatility model input data as input to an associated market volatility model.

Additionally or alternatively at step 219, the mutant nucleotide computing platform 120 may determine if an anomaly has been detected based on validating market volatility data. If an anomaly has been detected, the mutant nucleotide computing platform 120 may initiate anomaly correction instructions, convert the anomaly correction instructions to an anomaly correction mutant nucleotide sequence, and insert the anomaly correction mutant nucleotide sequence into the synthetic DNA market data set to correct the detected anomaly. In some examples, inserting the anomaly correction mutant nucleotide sequence may include transmitting the anomaly correction mutant nucleotide sequence to a synthetic DNA client server on which the synthetic DNA market data set is stored. In some examples, inserting the anomaly correction mutant nucleotide sequence may include removing a synthetic DNA data component or modifying a synthetic DNA data component to correct the detected anomaly. Upon correcting the detected anomaly, the mutant nucleotide computing platform 120 may remove the one or more data anomalies to form a validated synthetic DNA market data set. In some examples, removing the one or more data anomalies to form a validated synthetic DNA market data set may include transforming at least one strand of the synthetic DNA market data set to form a modified synthetic DNA strand.

Figure 4:
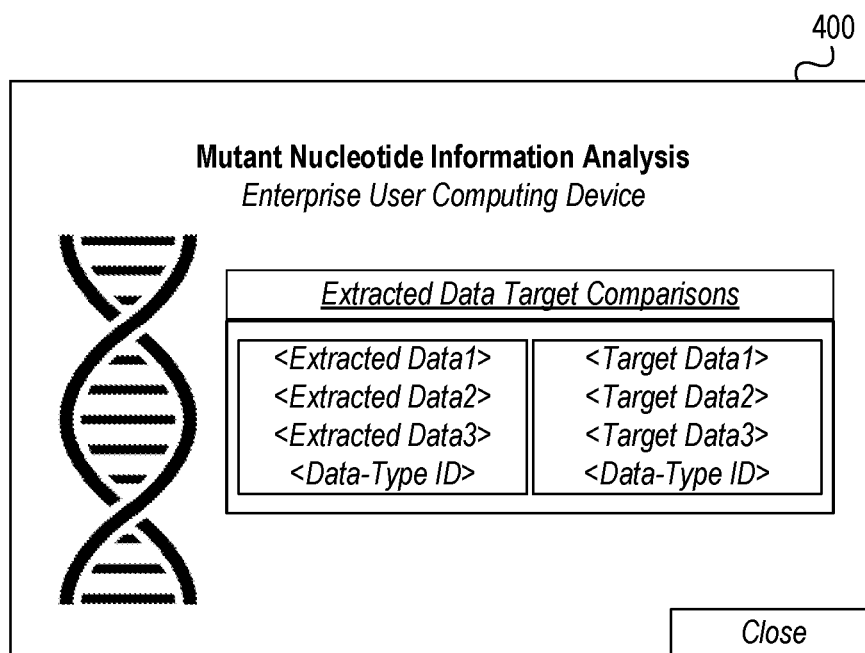

At step 220, the mutant nucleotide computing platform 120 may display graphics associated with the results of the mutant nucleotide sequence. In some embodiments, displaying the graphics associated with the results may include causing an interface for an enterprise associate at the enterprise center to be displayed on at least one monitoring dashboard user interface presented by an associate computing device. For example, in the one or more enterprise computer systems (e.g., enterprise server infrastructure 140, first enterprise computing device 150, second enterprise computing device 160, third enterprise computing device 170) display graphics associated with the results, mutant nucleotide computing platform 120 may cause the one or more enterprise computer systems (e.g., enterprise server infrastructure 140, first enterprise computing device 150, second enterprise computing device 160, third enterprise computing device 170) to display and/or otherwise present one or more graphical user interfaces similar to graphical user interface 400, which is illustrated in FIG. 4. As seen in FIG. 4, graphical user interface 400 may include text and/or other information associated with a "mutant nucleotide information analysis" results display. The results illustrated in FIG. 4 may, for instance, be sent by mutant nucleotide computing platform 120 may include a table with a number of data comparisons, e.g., between extracted data parameters from before the processing and target data points. The results display provided by graphical user interface 400 may allow an enterprise associate to visualize key metrics of the machine leaning model and, where applicable, provide one or more inputs as part of retraining the machine learning model and/or adjusting other parameters associated with the mutant nucleotide computing platform 120 and/or processing workloads by the enterprise system.

Additionally, or alternatively, at step 220, the mutant nucleotide computing platform 120 may output the validated synthetic DNA market data set to the synthetic DNA client server 180. The validated synthetic DNA market data set that is output to the synthetic DNA client server 180 may be configured for input into a market volatility prediction model.

Additionally, or alternatively, at step 220, the mutant nucleotide computing platform 120 may display one or more graphical user interfaces associated with the results on the mutant nucleotide sequence. In some embodiments, the displayed results may include information relating to validating the target information extracted by the mutant nucleotide sequence, information relating to the set of instructions associated with performing an action on a synthetic DNA market data set, and a status of the validated synthetic market DNA data set. In some examples, the results display may be configured to receive a user interaction relating to performing additional validation on the validated synthetic DNA market data set. In such examples, the mutant nucleotide computing platform 120 may then initiate a second set of instructions associated with performing a second action on the validated synthetic DNA market data set, and convert the second set of instructions to a second mutant nucleotide sequence configured to perform a second validation on the validated synthetic DNA market data set. In some examples, the results display may include information relating to a status of the validated synthetic DNA market data set.

In the systems and methods described herein, one or more market volatility forecasting applications may be performed using synthetic DNA stranded enterprise market data. In these examples, raw market data may be received from a plurality of lines of business across an enterprise organization. Such raw market data may be processed through one or more data engineering or data assimilation techniques as described herein. The raw market data may be discretized via data prefetch processes as described herein. Various additional or alternative preprocessing may be performed on the data, e.g., using vectoring processes to obtain temporal data as well as to identify and remove anomalies.

The preprocessed market data may then run through a synthetic DNA process in which the data is transformed into synthetic DNA stranded data, as described in more detail below. Mutant nucleotide computing techniques may subsequently be used for data validation on the synthetic DNA stranded market data.

The validated synthetic DNA stranded data may be set up for input into one or more market volatility forecasting applications. As part of setting up the validated synthetic DNA stranded data, one or more data quality checks, clustering processes, and/or segmentation processes may be performed. In some examples, a market volatility forecasting model visualization may be presented on a display of a computing platform and further selections and/or input may be received related to one or more market volatility forecasting models. Such displays may provide visualization of both a particular market volatility forecasting model and a selected set of enterprise market data so as to provide information suitable for a data analyst to select for the appropriate one or more market volatility forecasting models.

The validated synthetic DNA stranded data may be processed through the one or more market volatility forecasting models on a model serving computing infrastructure. In some examples, these market volatility forecasting model processes may be carried out on a parameter basis. As part of running the one or more market volatility forecasting models, a prediction interface may be provided that displays various input categories, receives provided inputs, and runs the one or more market volatility forecasting models with the provided inputs. Using the one or more market volatility forecasting models, volatility forecasting parameters may be computed.

In some examples, a market application interface may be provided that displays a visualization of the computed volatility forecasting parameters. The market application interface may be configured to receive model algorithm prediction that relates to an accuracy or relevance of the one or more market volatility forecasting models on a particular enterprise market data set. The model algorithm prediction may be used with a machine learning engine to update one or more market volatility forecasting models based on the results of the computed volatility forecasting parameters. In some examples, the model algorithm prediction may be used to adjust processed data used as input in the one or more market volatility forecasting models.

In some examples, the computed volatility forecasting parameters may be used for various forecasting analyses. For example, future volumes may be forecasted using regression analyses in the market volatility forecasting models. The one or more market volatility forecasting models may include various volatility factors which may be adjustable, e.g., specific to a business, for appropriate market volatility predictions. Accordingly, business and resource planning may be adjusted to manage business demands in accordance with computed volatility forecasting parameters specific to a particular business or group of businesses.

Figure 5:
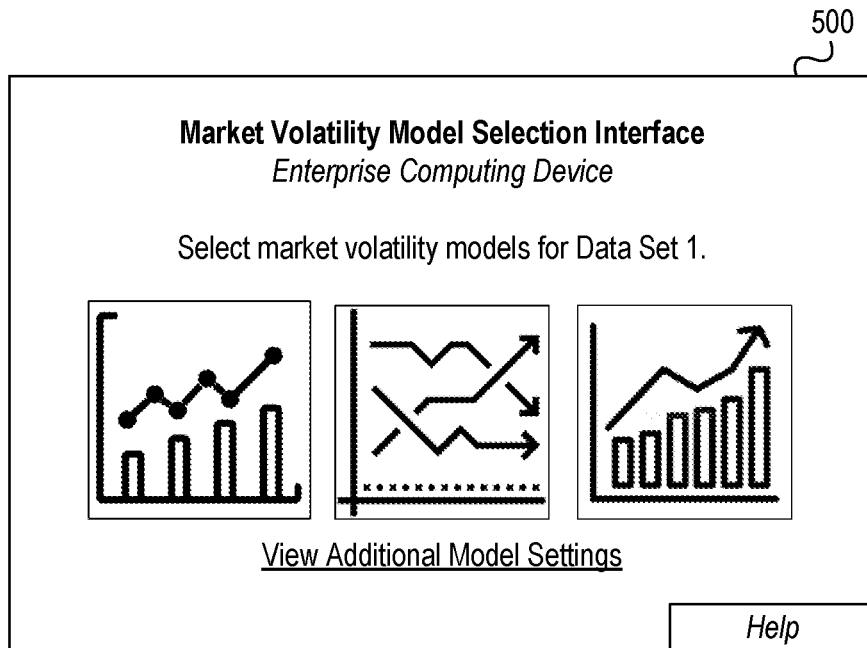

Referring to FIG. 2F, at step 221, the market volatility prediction computing platform 130 may present one or more market volatility models to an interface. For example, in providing the interface at step 222, the market volatility prediction computing platform 130 may generate and/or send information to a device linked to an enterprise associate (e.g., the first enterprise computing device 150, the second enterprise computing device 160, the third enterprise computing device 170) which may cause the device to generate, display, and/or otherwise present a graphical user interface similar to graphical user interface 500, which is illustrated in FIG. 5. As seen in FIG. 5, graphical user interface 500 may include graphical images, text and/or other information indicating that a series of one or more market volatility models from which an enterprise user may choose. The one or more market volatility models display on the graphical user interface 500 may include a subset of available market volatility models selected based on one or more aspects of a current market data set. In that regard, a descriptor of the current market data set may also be provided at graphical user interface 500. One or more user-selectable controls may also be included, allowing the user of the enterprise associate device (e.g., the first enterprise computing device 150, the second enterprise computing device 160, the third enterprise computing device 170) to view the additional data relating to various market volatility models (e.g., "View Additional Model Settings").

At step 222, the market volatility prediction computing platform 130 may receive model algorithm prediction relating to one or more selections from the presented market volatility models. The model algorithm prediction may be received from the user of the enterprise associate (e.g., the first enterprise computing device 150, the second enterprise computing device 160, the third enterprise computing device 170).

At step 223, the market volatility prediction computing platform 130 may receive synthetic DNA stranded market data from the synthetic DNA client server 180. In some examples, the synthetic DNA stranded market data received at step 223 may be selected based on one or more components of the model algorithm prediction received at step 222. In some examples, the synthetic DNA stranded market data received at step 223 may be selected based on an additional user selection relating to a selections enterprise market volatility forecasts to be performed.

At step 224, the market volatility prediction computing platform 130 may cluster and segment the synthetic DNA stranded market data from the synthetic DNA client server 180. Clustering and segmenting the synthetic DNA stranded market data at step 224 more include one or more preprocessing routines to put the synthetic DNA stranded market data in a format suitable for input into the one or more selected marker volatility forecasting models.

Referring to FIG. 2G, at step 225, the market volatility prediction computing platform 130 may process the clustered and segmented synthetic DNA stranded market data through the selected one or more market volatility process models. The one or more market volatility process models used at step 225 may be based on the model algorithm prediction from step 222.

At step 226, the market volatility prediction computing platform 130 may receive a user input from a prediction interface related to the market volatility prediction models. The user input received at step 226 may relate to one or more display parameters associated with display results of the one or more market volatility models. In some examples, the user input received at step 226 may relate to one or more input parameter associated with executing and compiling results from the one or more market volatility prediction models.

At step 227, the market volatility prediction computing platform 130 may compute one or more market volatility forecasting parameters based on the user input received at step 226. The one or more market volatility forecasting parameters computed at step 227 may include results compiled from the one or more market volatility models on the synthetic DNA stranded market data.

At step 228, the market volatility prediction computing platform 130 may provide a forecasting visualization to a market application interface. In some examples, providing the forecasting visualization to the market application interface may include presenting a prediction interface, receiving at least one user selection at the prediction interface relating to a setting for the one or more market volatility models, and computing a volatility forecasting parameter in accordance with the at least one user selection.

Figure 6:
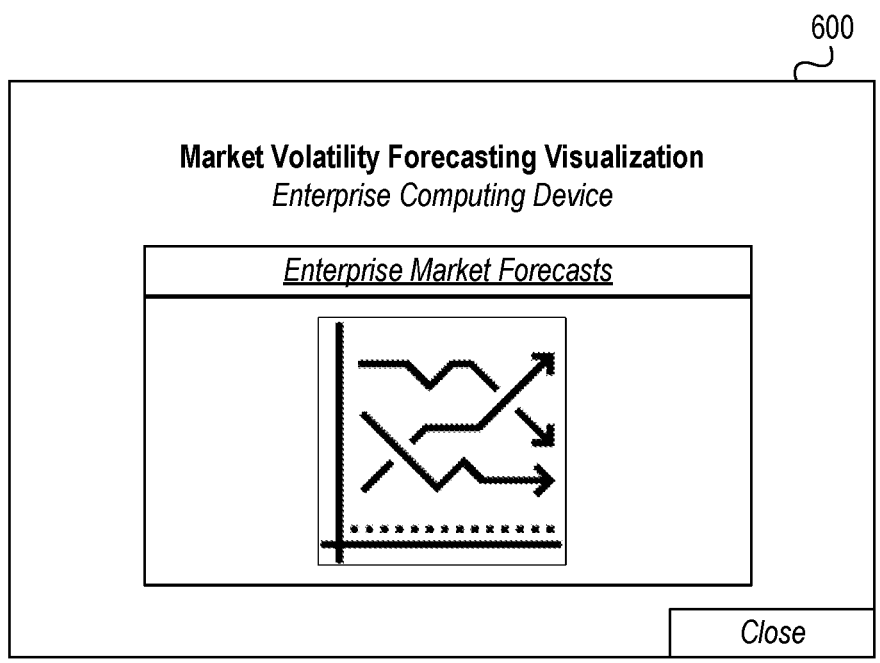

Additionally or alternatively, in providing the forecasting visualization to the market application interface at step 228, market volatility prediction computing platform 130 may generate and/or send information to a device linked to an enterprise associate (e.g., the first enterprise computing device 150, the second enterprise computing device 160, the third enterprise computing device 170) which may cause the device to generate, display, and/or otherwise present a graphical user interface similar to graphical user interface 600, which is illustrated in FIG. 6. As seen in FIG. 6, graphical user interface 600 may include text and/or other information indicating results of the enterprise market volatility model predictions, providing a description of the lines of business involved in the forecast results, other data descriptors associated with market data involved in the forecast results, and the like, as well as one or more user-selectable controls allowing the user of the enterprise associate (e.g., the first enterprise computing device 150, the second enterprise computing device 160, the third enterprise computing device 170) to view the additional data relating to the forecast results.

The results provided at step 228 may include one or more market volatility forecasting parameters based on results of the one or more market volatility models. In some examples, step 228 may include receiving a user interaction with the market application interface relating to executing an additional market volatility model on the synthetic DNA stranded market data, running the synthetic DNA stranded market data through the additional market volatility model, and transmitting results from the additional market volatility model to the market application interface. The results provided may include results from the one or more market volatility models on the synthetic DNA stranded market data and one or more market volatility forecasting parameters based on results of the one or more market volatility models.

Figure 2H:
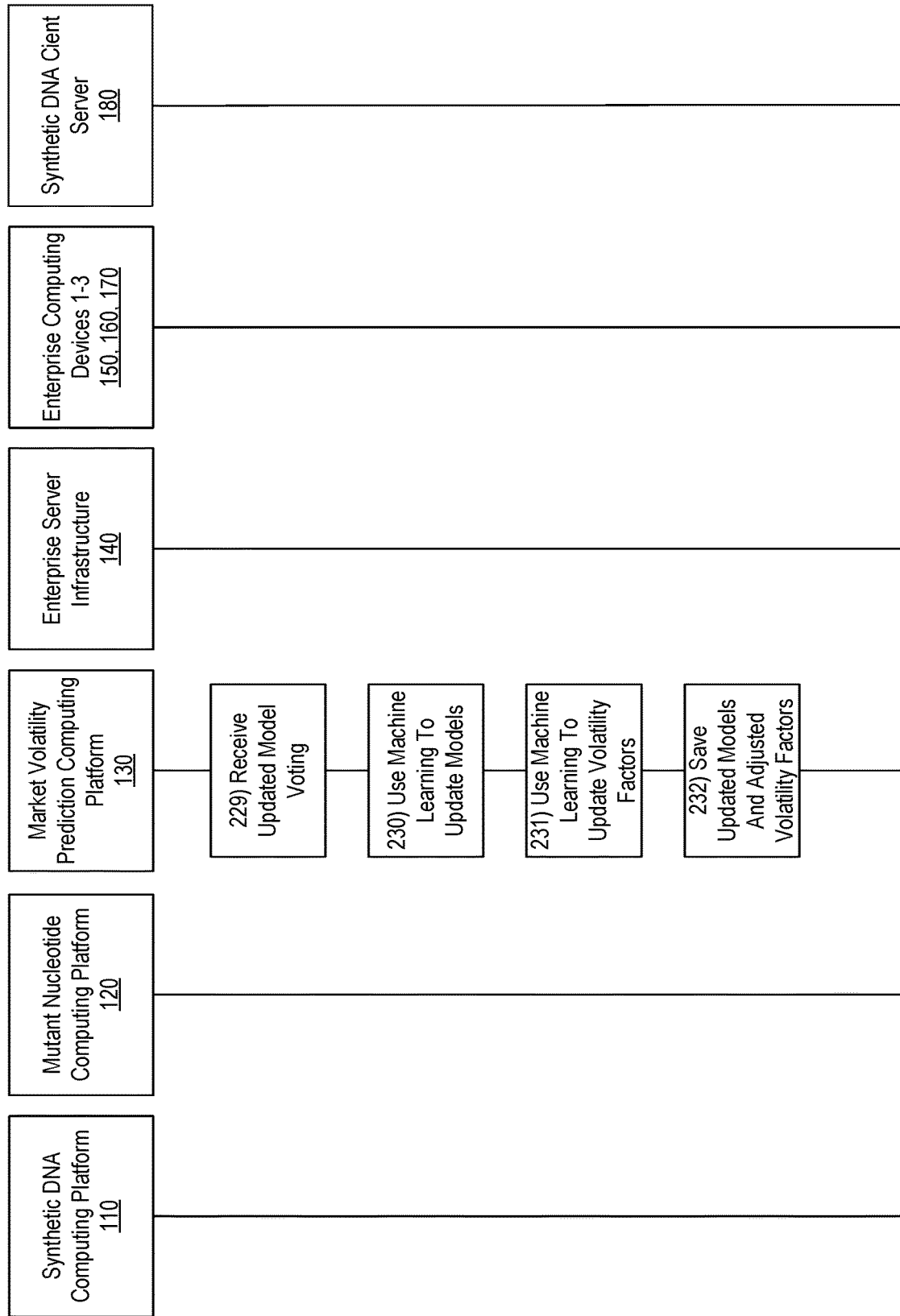

Referring to FIG. 2H, at step 229, the market volatility prediction computing platform 130 may receive updated model algorithm prediction, e.g., received at interface 600. The updated model algorithm prediction may be received at the market application interface, and may be associated with the results from the one or more market volatility models, and the one or more market volatility models may then subsequently be updated based on the updated model algorithm prediction.

At step 230, the market volatility prediction computing platform 130 may use a machine learning model to update one or more market volatility forecasting models based on the results. At step 231, the market volatility prediction computing platform 130 may use machine learning to adjust one or more volatility factors, e.g., specific to a business for market volatility prediction models. At step 232, the market volatility prediction computing platform 130 may save the updated market volatility prediction models to a model database, such as market volatility model database 132b.

Subsequently, the market volatility prediction computing platform 130 may repeat one or more steps of the example event sequence discussed above in training and using machine-learning models to set up and execute one or more market volatility models using synthetic DNA stranded enterprise market data. Additionally or alternatively, market volatility prediction computing platform 130 may initiate one or more market volatility analysis processes and/or generate and send one or more data results interfaces, similar to how market volatility prediction computing platform 130 may initiate such processes and generate and send such interfaces in the examples described above.

Figure 7:
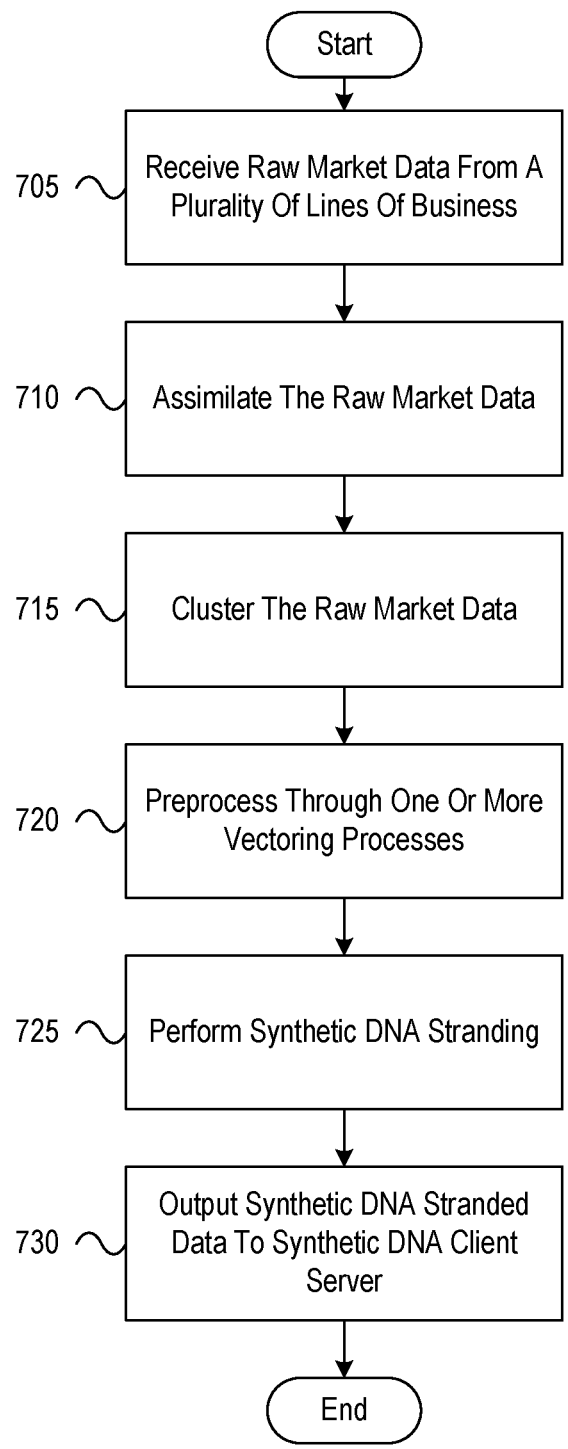
FIG. 7 depicts an illustrative method for processing enterprise market data into synthetic DNA stranded data suitable for input to market volatility prediction models in accordance with one or more example embodiments.

FIG. 7 depicts an illustrative method for processing enterprise market data into synthetic DNA stranded data suitable for input to market volatility prediction models in accordance with one or more example embodiments. Referring to FIG. 7, at step 705, a computing platform having at least one processor, a communication interface, and memory may receive, e.g., via the communication interface and from one or more enterprise data source computer systems, raw market data from a plurality of lines of business across an enterprise organization in a raw, uncompressed format organization. In some examples, receiving the raw market data at step 705 may include receiving a first set of market data from a first line business of an enterprise and a second set of market data from a second line business of an enterprise, where the first set of market data and the second set of market data are received in a raw, uncompressed format. In some examples, receiving the raw market data at step 705 may also include receiving a third set of market data from a third line business of an enterprise in a raw, uncompressed format, At step 710, the computing platform may assimilate the raw market data using a data assimilation process. In a similar manner, at step 715 the computing platform may cluster the assimilated raw market data into one or more clusters using a data engineering clustering process. In some examples, assimilating the raw market data at step 715 may include assimilating the first set of market data with second set of market data to form an assimilated market data cluster. In some examples, assimilating the raw market data at step 715 may include assimilating the third set of market set with the first set of market data and the second set of market data to form an assimilated market data cluster. In some examples, at step 715, the computing platform may run a prefetch process on the assimilated raw market data, where the prefetch process includes splitting the assimilated raw market data into a plurality of batches and discretizing each of the plurality of batches. The computing platform may then send a first batch of discretized market data to a synthetic DNA stranding process module prior to discretizing a second batch of market data. In some examples, clustering the assimilated raw market data at step 710 may include consolidating the raw market data into one or more Hadoop clusters.

At step 720, the computing platform may preprocess one or more market data clusters through at least one vectoring process to output vectored market data. Preprocessing the one or more market data clusters through at least one vectoring process may include performing a feature vectoring process that includes encoding a first batch of market data in a long short-term memory network. The feature vectoring process may include forming a latent representation of the encoded market data. In some examples, preprocessing the one or more market data clusters through at least one vectoring process may include performing a temporal vectoring process that includes concatenating temporal aspects of a first batch of market data into a series of temporal vectors. In some examples, preprocessing the one or more market data clusters through at least one vectoring process may include performing an anomaly vectoring process that includes applying a classification model to a first batch of market data to detect an anomaly relative to surrounding data. The anomaly vectoring process may further include removing data associated with the detected anomaly from the first batch of market data.

At step 725 the computing platform may perform a synthetic DNA stranding process on the vectored market data to create one or more strands of synthetic DNA market data. Performing synthetic DNA stranding on the preprocessed market data may include transforming the preprocessed market data into a plurality of integrated gradients. The one or more strands of synthetic DNA market data may then comprise a sequence of integrated gradients. In some examples, the computing platform may transmit a notification to an enterprise computing device that indicates a completion status of the synthetic DNA stranding process and a data set associated with the completed synthetic DNA stranding process.

At step 730, the computing platform may output the one or more strands of synthetic DNA market data to a synthetic DNA client server. The one or more stands of synthetic DNA market data sent to the synthetic DNA client server may be configured for input in a market volatility prediction model.

Figure 8:
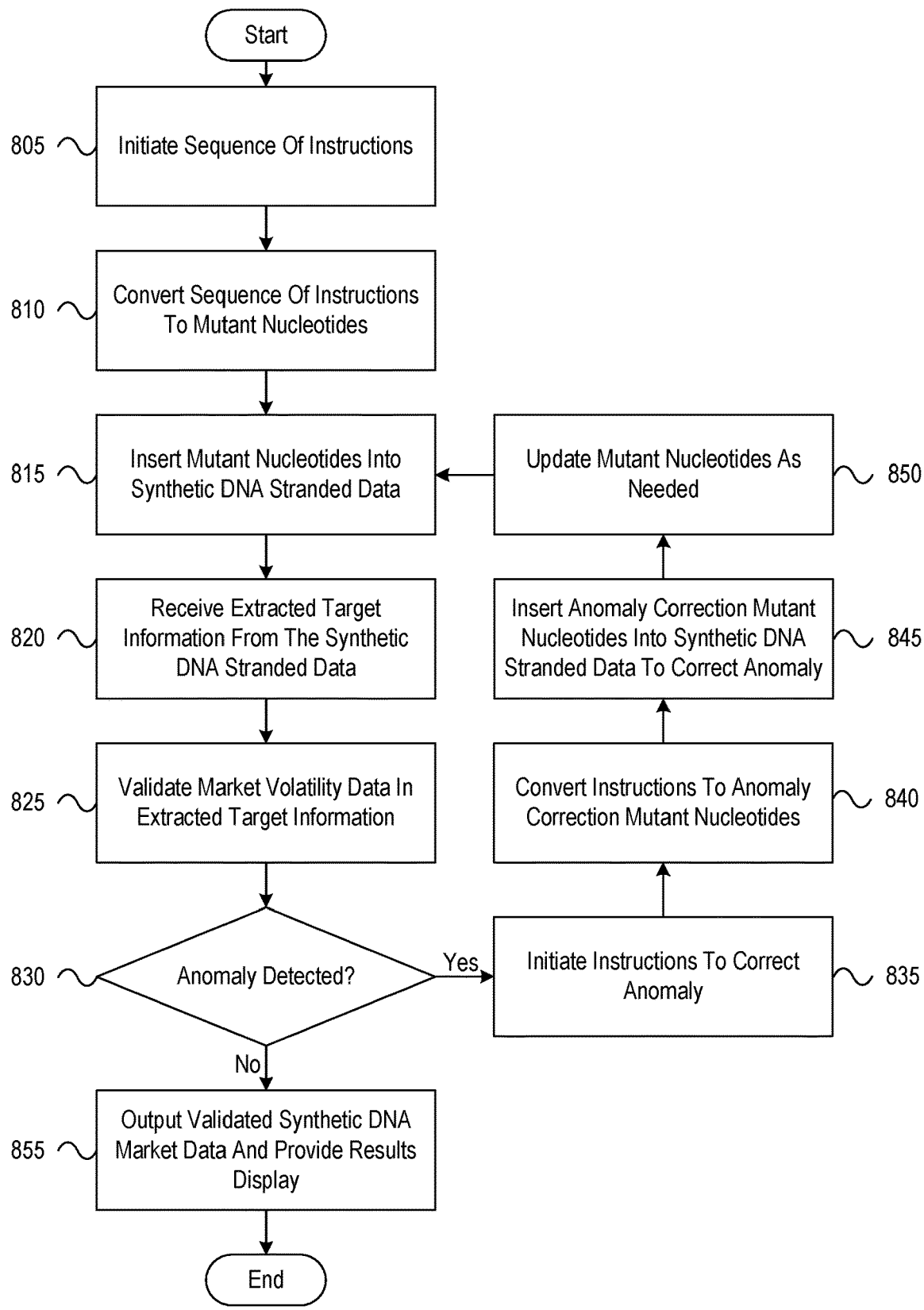
FIG. 8 depicts an illustrative method for using mutant nucleotide processes to validate enterprise market data as input for market volatility prediction models in accordance with one or more example embodiments.

FIG. 8 depicts an illustrative method for using mutant nucleotide processes to validate enterprise market data as input for market volatility prediction models in accordance with one or more example embodiments. Referring to FIG. 8, at step 805, a computing platform having at least one processor, a communication interface, and memory may initiate a sequence of instructions. The set of instructions initiated at step 805 may include instructions associated with performing an action on a synthetic DNA market data set that includes market data associated with a plurality of lines of business across an enterprise organization. The set of instructions initiated at step 805 may include instructions relating to one or more data validation processes for synthetic DNA stranded market data. At step 810, the computing platform may convert the set of instructions to a mutant nucleotide sequence. At step 815, the computing platform may insert the mutant nucleotide sequence into the synthetic DNA market data set. In some examples, inserting the mutant nucleotide sequence at step 815 may include transmitting the mutant nucleotide sequence to a synthetic DNA client server on which the synthetic DNA market data set is stored.

At step 820, the computing platform may receive target information from the synthetic DNA market data set that is extracted using the mutant nucleotide sequence. In some examples, receiving the extracted target information at step 820 may include conjugating the mutant nucleotide sequence into the synthetic DNA market data set and obtaining target information from the synthetic DNA market data set using the mutant nucleotide sequence.

At step 825, the computing platform may validate market volatility data based on the extracted target information. In some examples, validating market volatility data at step 825 may include applying validation rules to the extracted target information. In some examples, validating market volatility data at step 825 may include analyzing the extracted target information to detect one or more anomalies. In some examples, validating market volatility data at step 825 may include comparing the extracted target information to a baseline data structure and identifying the one or more anomalies based on comparing the extracted target information to the baseline data structure. In some examples, validating market volatility data at step 825 may include extracting a first component from the synthetic DNA market data set and a second component from the synthetic DNA market data set. The first component may be associated with data from a first line of business and the second component may be associated with data from a second line of business. The first component may then be compared to the second component to assess a difference in a data structure characteristic, and at least of portion of the first component may then be modified based on assessing a difference in the data structure characteristic of the first component relative to the second component. In some examples, validating market volatility data at step 825 may include extracting market volatility model input data from the extracted target information, and performing an input data check on the extracted market volatility model input data to validate the extracted market volatility model input data as input to an associated market volatility model.

At step 830, the computing platform may determine if an anomaly has been detected based on validating market volatility data at step 825. If an anomaly has been detected, the computing platform may initiate anomaly correction instructions at step 835. At step 840, the computing platform may convert the anomaly correction instructions to an anomaly correction mutant nucleotide sequence.

At step 845, the computing platform may insert the anomaly correction mutant nucleotide sequence into the synthetic DNA market data set to correct the detected anomaly. In some examples, inserting the anomaly correction mutant nucleotide sequence at step 845 may include transmitting the anomaly correction mutant nucleotide sequence to a synthetic DNA client server on which the synthetic DNA market data set is stored. In some examples, inserting the anomaly correction mutant nucleotide sequence at step 845 may include removing a synthetic DNA data component or modifying a synthetic DNA data component to correct the detected anomaly. Upon correcting the detected anomaly, the computing platform may remove the one or more data anomalies to form a validated synthetic DNA market data set. In some examples, removing the one or more data anomalies to form a validated synthetic DNA market data set may include transforming at least one strand of the synthetic DNA market data set to form a modified synthetic DNA strand.

At step 850, the computing platform may update the mutant nucleotide sequences as needed and repeat steps 815 through 830 until no further anomalies are detected. If further anomalies are detected, the computing platform may repeat steps 835 through 850. If no further anomalies are detected, the computing platform may output, via the communication interface, the validated synthetic DNA market data set to the synthetic DNA client server at step 855. The validated synthetic DNA market data set that is output to the synthetic DNA client server may be configured for input into a market volatility prediction model.

Outputting the validated synthetic DNA market data set to the synthetic DNA client server at step 855 may include causing an enterprise computing device to display one or more graphical user interfaces associated with the results on the mutant nucleotide sequence. In some embodiments, the computing platform may provide a results display on a display of the computing platform that includes information relating to validating the target information extracted by the mutant nucleotide sequence. The results display may include information relating to the set of instructions associated with performing an action on a synthetic DNA market data set and a status of the validated synthetic market DNA data set. In some examples, the computing platform may receive a user interaction with the results display relating to performing additional validation on the validated synthetic DNA market data set. In such examples, the computing platform may then initiate a second set of instructions associated with performing a second action on the validated synthetic DNA market data set, and convert the second set of instructions to a second mutant nucleotide sequence configured to perform a second validation on the validated synthetic DNA market data set. In some examples, step 855 may include providing a results display on a display of the computing platform that includes information relating to a status of the validated synthetic DNA market data set.

Figure 9:
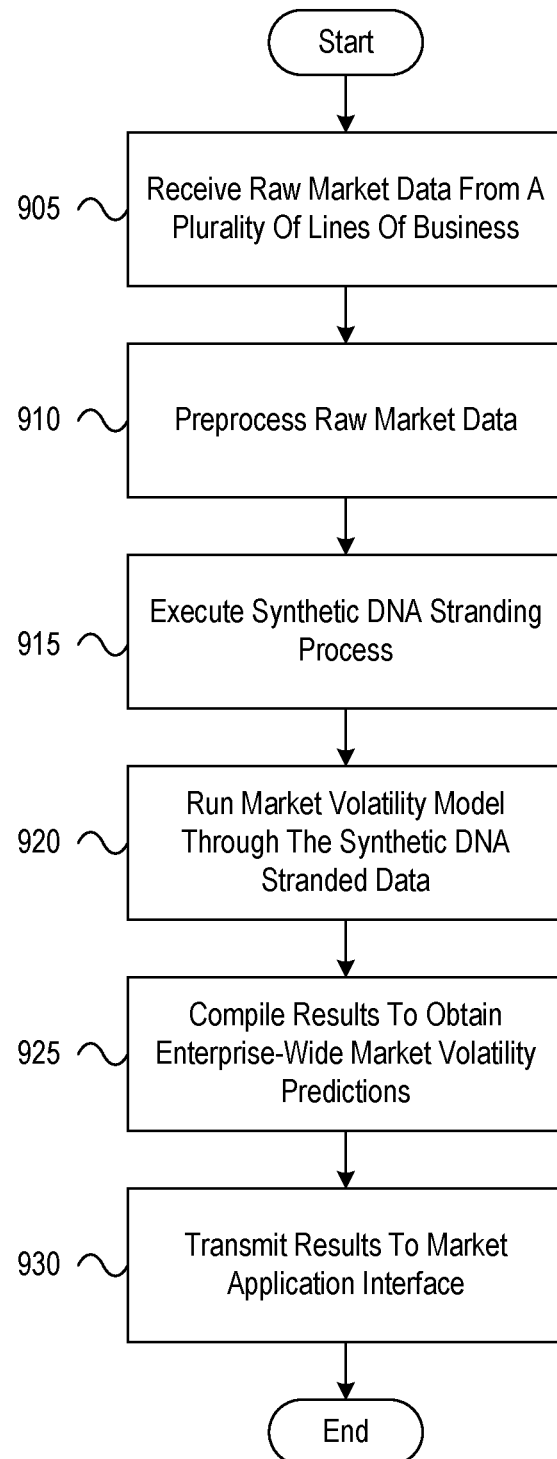
FIG. 9 depicts an illustrative method for conducting enterprise market volatility testing on synthetic DNA stranded market data in accordance with one or more example embodiments.

FIG. 9 depicts an illustrative method for conducting enterprise market volatility testing on synthetic DNA stranded market data in accordance with one or more example embodiments. Referring to FIG. 9, at step 905, a computing platform having at least one processor, a communication interface, and memory may receive raw market data from a plurality of lines of business of an enterprise organization. At step 910, the computing platform may preprocess the raw market data to obtain enterprise level market data.

At step 915, the computing platform may execute synthetic DNA stranding of the enterprise level market data to obtain synthetic DNA stranded market data. In some examples, executing the synthetic DNA stranding of the enterprise level market data may include clustering and segmenting the synthetic DNA stranded market data.

At step 920, the computing platform may run the synthetic DNA stranded market data through one or more market volatility models. In some embodiments, step 920 may include presenting a market volatility model selection interface that includes a plurality of market volatility forecasting models and receiving a user selection corresponding to at least one of the plurality of market volatility forecasting models. Subsequently, running the synthetic DNA stranded market data through one or more market volatility models at step 920 may include running the at least one of the plurality of market volatility forecasting models corresponding to the user selection. In some examples, the computing platform may receive a model algorithm prediction corresponding to the one or more market volatility models. Subsequently, at step 920, the synthetic DNA stranded market data may be run through one or more market volatility models in accordance with the model algorithm prediction.

At step 925, the computing platform may then compile results from the one or more market volatility models on the synthetic DNA stranded market data to obtain enterprise-wide market volatility predictions. In some examples, compiling results from the one or more market volatility models on the synthetic DNA stranded market data at step 925 may include presenting a prediction interface, receiving at least one user selection at the prediction interface relating to a setting for the one or more market volatility models, and computing a volatility forecasting parameter in accordance with the at least one user selection. In some embodiments, the computing platform may update the one or more market volatility models at step 925 using a machine learning model and based on results from the one or more market volatility models. In some examples, step 925 may include updating at least one volatility factor specific to a business for the one or more market volatility models using a machine learning model and based on results from the one or more market volatility models.

At step 930, the computing platform may thereafter transmit, via the communication interface, results from the one or more market volatility models on the synthetic DNA stranded market data. The results transmitted at step 930 may be configured to display a market application interface that includes one or more market volatility forecasting parameters based on results of the one or more market volatility models. In some embodiments, step 930 may include outputting the synthetic DNA stranded market data to a synthetic DNA client server that is configured to store the synthetic DNA stranded market data and provide at least a portion of the synthetic DNA stranded market data to the computing platform responsive to a data request. In some examples, step 930 may include receiving a user interaction with the market application interface relating to executing an additional market volatility model on the synthetic DNA stranded market data, running the synthetic DNA stranded market data through the additional market volatility model, and transmitting, via the communication interface, results from the additional market volatility model to the market application interface. In addition, the computing platform may receive an updated model algorithm prediction via the market application interface, wherein the updated model algorithm prediction is associated with the results from the one or more market volatility models, and wherein the one or more market volatility models are updated based on the updated model algorithm prediction. The results display may include results from the one or more market volatility models on the synthetic DNA stranded market data and one or more market volatility forecasting parameters based on results of the one or more market volatility models. In some examples, step 930 may include receiving an updated model algorithm prediction via the market application interface, wherein the updated model algorithm prediction is associated with the results from the one or more market volatility models, and wherein the one or more market volatility models are updated based on the updated model algorithm prediction.

Devices, systems, and methods, as described herein, relate to computational techniques for conducting enterprise market volatility predictions using synthetic DNA and mutant nucleotide processes. An entity (e.g., a computing device, a private computing network, an enterprise organization, a multi-platform computing network, etc.) may be associated with an executable application deployed for execution and access by users via a computing system environment, for example, including one or more enterprise computing system environments. The computing system environment may include one or more of a web server, an application server, a database server, an encryption device, a storage device, or a file server.

The system may perform executable applications based on synthetic DNA stranded data to complete various market forecasts or predictions and may provide, for example, increased processing speeds, greater throughput, ability to handle more simultaneous requests, and/or straightforward scalability as the data set increases or decreases. The scalability benefits may include meeting dynamically changing computing capabilities requirements without requiring dedicated resources to meet the maximum peak performance requirements at all times, although the maximum peak performance may only be infrequently required. Although code for the executable application may have been modified to target a particular computing system environment and/or recompiled with libraries targeted toward the computing system environment, these modifications may not capture or reflect all of the operational and/or environment differences of a computing system environment.

Systems and methods described herein provide a number of benefits over known systems in which predicting market volatility often involves multiple models and large amounts of data. Various market scenarios, e.g., triple witching, month end closures, geopolitical events, and the like, involve real-time processing and specialized analysis and further add to the complexity of such known market volatility prediction tools. And data storage systems associated with such known tools often require large data storage capacity. Maintaining such databases in an efficient manner may be difficult, handling the data stored therein may be time consuming, and constraints on the databases may impact the ability for accurate predictive modelling. Similarly, validation and processing of such large databases to perform modelling to manage market volatility may lack efficiency and accuracy.

While there may be protocols in place to validate authenticity of data flowing into market systems, assimilating market data in a cumulative cluster for further processing and analysis provides a number of benefits. For example, computational platforms described herein have the robustness to process synthetic DNA data in a centralized platform, while maintaining confidentiality of the data (via the data encoding as part of the synthetic DNA stranding process). Additionally, the processing time to validate and finalize the results using the systems and methods described herein may be substantially reduced relative to conventional systems. Accordingly, the systems and methods described herein may be able to handle market volatility information validation in a centralized way at an enterprise level.

Typically, the various application and/or computing system configuration settings of the computing system environment may simply be configured by a related executable application and/or computing system environment. The configuration settings may include a quantity of modelling processes that may be executed simultaneously, a quantity of operations per second that may be performed by the computing system environment, a quantity of memory addresses that may be allocated to one or more processes executed by the computing system environment, or others. An optimal set of application and/or computing system configuration settings for the executable application and/or computing system environment may not yet have been determined due to an absence of predictive information pertaining to the computational requirements, operational behavior, and performance of the executable application.

For example, some executable applications may be unable to effectively process a certain quantity of market data at a given time based on a particular market volatility prediction model according to a default set of configuration parameter settings, and may not be optimized to varying setting and/or workload parameters. Performance issues arising in the executable applications on the computing system environment may be due to one or more servers of the computing system environment not being configured optimally. Configuration parameters set for an original executable application on a computing system environment simply being copied over from a previous executable application without a new analysis based on the actual current workload parameters and/or software deployed thereon may lead to the introduction of the performance issues and/or operational problems and errors. This may be due to an assumption that in a cloud computing model featuring the computing system environment, memory and/or computational capacity is unlimited due to scalability and that the migrated executable application will not fail in the cloud computing model due to elasticity of the cloud computing environment. However, performance may be dependent upon configuration settings for the executable application in addition to configuration settings for current workload.

Arrangements discussed herein may address the aforementioned issues by customizing market volatility prediction models in accordance with one or more aspects of the synthetic DNA data set, and the application and/or computing system configuration parameters in the computing system environment in relation to one or more configuration settings for the modelling executions and/or the computing system environment. The aforementioned issues may be addressed by customizing models and/or computing system parameters based on monitoring performance of a market volatility prediction model in a first computing system environment in relation to one or more configuration settings for the model and/or the computing system environment. The model and/or computing system configuration parameters may be based on information from historical model executions on the computing system environment. The model and/or computing system configuration parameters may be based on determining optimal configuration parameter values and/or ranges of preferred and/or acceptable configuration parameters. Computational optimization, for example, multidimensional optimization, polynomial optimization, artificial intelligence, and/or machine learning techniques may be used to determine best configuration setting values and/or value ranges based on designated target performance metrics, based on the monitored performance of executing a workload in the computing system environment, based on information from historical executions on the computing system environment, and/or based on the monitored performance of executions on the computing system environment.

Ongoing adjustments to configuration setting values may be determined based on ongoing monitoring of performance metrics of the modelling executions and/or the computing system environment. The monitoring may be in relation to one or more configuration settings for the modelling executions and/or the computing system environment. The ongoing adjustments to configuration setting values may also be based on information from historical modelling executions on the computing system environment. The ongoing adjustments to configuration setting values may comprise determining optimal configuration parameter values and/or ranges of preferred and/or acceptable workload and/or computing system configuration parameters. The ongoing adjustments to configuration setting values may comprise determining interdependencies of the various configuration parameters and settings. Multidimensional optimization, polynomial optimization, artificial intelligence, and/or machine learning techniques may be used to determine best configuration setting values and/or value ranges based on designated target performance metrics, based on interdependencies of the configuration parameters and settings, and/or based on the monitored performance of the modelling executions and/or the computing system environment.

Ongoing monitoring and evaluation of the modelling executions and/or the computing system environment may comprise monitoring, logging, and/or analyzing real-time/runtime configuration parameter settings, values, and/or real-time/runtime performance metrics. Logged real-time/runtime data may be validated against defined policies and/or templates. Deviations from acceptable values and ranges may be flagged to notify an administrative function of the deviations, initiate an analysis, and/or initiate a determination of one or more corrective actions that may be taken to bring the performance metrics back into conformance with the policies and/or templates. Policies and templates may comprise: standard definitions of configuration parameters and/or performance metrics; ideal, upper, and/or lower bound values for the configuration parameters and/or performance metrics; and/or one or more standard combinations of settings and values for the configuration parameters and/or performance metrics upon which operation of the executable application may be based.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      initiate a set of coded instructions associated with performing an action on a synthetic DNA market data set, wherein the synthetic DNA market data set includes market data associated with a plurality of lines of business across an enterprise organization;
      convert the set of coded instructions to a mutant nucleotide sequence, wherein converting the set of coded instructions including executing a transform algorithm to translate the set of coded instructions to the mutant nucleotide sequence, wherein the mutant nucleotide sequence is configured to interact with and process data from the synthetic DNA market data set;
      insert the mutant nucleotide sequence into the synthetic DNA market data set;
      extract, using the mutant nucleotide sequence, target information from the synthetic DNA market data set;
      based on extracting the target information, validate the target information, wherein validating the target information includes:
         applying validation rules to the target information; and
         analyzing the target information to detect one or more anomalies;
      upon detecting one or more data anomalies, automatically reconfigure the target information to remove the one or more data anomalies and to form a validated synthetic DNA market data set; and
      output the validated synthetic DNA market data set to a synthetic DNA client server, wherein the synthetic DNA client server is configured to input the validated synthetic DNA market data set into a market volatility prediction model.

2. The computing platform of claim 1, wherein extracting the target information includes conjugating the mutant nucleotide sequence into the synthetic DNA market data set and obtaining the target information from the synthetic DNA market data set.

3. The computing platform of claim 1, wherein validating the target information includes comparing the target information to a baseline data structure and identifying the one or more anomalies based on comparing the target information to the baseline data structure.

4. The computing platform of claim 1, wherein validating the target information includes:
   extracting a first component from the synthetic DNA market data set and a second component from the synthetic DNA market data set, wherein the first component is associated with data from a first line of business of the plurality of lines of business across the enterprise organization and the second component is associated with data from a second line of business of the plurality of lines of business across the enterprise organization;
   comparing the first component to the second component to assess a difference in a data structure characteristic; and
   modifying at least a portion of the first component based on assessing a difference in the data structure characteristic of the first component relative to the second component.

5. The computing platform of claim 1, wherein validating the target information includes:
   extracting market volatility model input data from the target information; and
   performing an input data check on the extracted market volatility model input data to validate the extracted market volatility model input data as input to an associated market volatility model.

6. The computing platform of claim 1, wherein automatically reconfigure the target information to remove the one or more data anomalies and to form a validated synthetic DNA market data set includes:
   initiating a set of anomaly instructions to remove the one or more data anomalies;
   converting the set of anomaly instructions to a mutant nucleotide anomaly removal sequence;
   inserting the mutant nucleotide anomaly removal sequence into the synthetic DNA market data set; and
   removing, using the mutant nucleotide anomaly removal sequence, the one or more data anomalies from the synthetic DNA market data set.

7. The computing platform of claim 1, wherein automatically reconfigure the target information to remove the one or more data anomalies and to form a validated synthetic DNA market data set includes:
   transforming at least one strand of the synthetic DNA market data set to form a modified synthetic DNA strand.

8. The computing platform of claim 1, wherein the memory further stores computer-readable instructions that, when executed by the at least one processor, cause the computing platform to:
   provide a results display on a display of the computing platform, wherein the results display includes information relating to validating the target information extracted by the mutant nucleotide sequence.

9. The computing platform of claim 1, wherein the memory further stores computer-readable instructions that, when executed by the at least one processor, cause the computing platform to:
   provide a results display on a display of the computing platform, wherein the results display includes information relating to set of instructions associated with performing an action on a synthetic DNA market data set and a status of the validated synthetic market DNA data set.

10. The computing platform of claim 9, wherein the memory further stores computer-readable instructions that, when executed by the at least one processor, cause the computing platform to:
   receive a user interaction with the results display relating to performing additional validation on the validated synthetic DNA market data set;
   initiate a second set of instructions associated with performing a second action on the validated synthetic DNA market data set; and convert the second set of instructions to a second mutant nucleotide sequence configured to perform a second validation on the validated synthetic DNA market data set.

11. A method, comprising:
at a computing platform comprising at least one processor, a communication interface, and memory:
initiating a set of coded instructions associated with performing an action on a synthetic DNA market data set, wherein the synthetic DNA market data set includes market data associated with a plurality of lines of business across an enterprise organization;
converting the set of coded instructions to a mutant nucleotide sequence, wherein converting the set of coded instructions including executing a transform algorithm to translate the set of coded instructions to the mutant nucleotide sequence, wherein the mutant nucleotide sequence is configured to interact with and process data from the synthetic DNA market data set;
inserting the mutant nucleotide sequence into the synthetic DNA market data set;
extracting, using the mutant nucleotide sequence, target information from the synthetic DNA market data set;
validating the extracted target information to form a validated synthetic DNA market data set, wherein validating the extracted target information includes analyzing the target information to detect one or more anomalies and automatically reconfiguring the target information to remove the one or more anomalies; and
outputting the validated synthetic DNA market data set to a synthetic DNA client server, wherein the synthetic DNA client server is configured to input the validated synthetic DNA market data set into a market volatility prediction model; and
providing a results display on a display of the computing platform, wherein the results display includes information relating to a status of the validated synthetic DNA market data set.

12. The method of claim 11, wherein validating the target information includes:
applying validation rules to the target information; and
analyzing the target information to detect one or more anomalies.

13. The method of claim 12, further comprising:
upon detecting one or more anomalies, removing the one or more anomalies to form the validated synthetic DNA market data set.

14. The method of claim 11, wherein extracting the target information includes conjugating the mutant nucleotide sequence into the synthetic DNA market data set and obtaining the target information from the synthetic DNA market data set.

15. The method of claim 11, wherein validating the target information includes comparing the target information to a baseline data structure and identifying the one or more anomalies based on comparing the target information to baseline data structure.

16. The method of claim 11, wherein validating the target information includes:
extracting a first component from the synthetic DNA market data set and a second component from the synthetic DNA market data set, wherein the first component is associated with data from a first line of business of the plurality of lines of business across the enterprise organization and the second component is associated with data from a second line of business of the plurality of lines of business across the enterprise organization;
comparing the first component to the second component to assess differences in a data structure characteristic; and
modifying at least a portion of the first component based on assessing a difference in the data structure characteristic of the first component relative to the second component.

17. The method of claim 11, wherein validating the target information includes:
extracting market volatility model input data from the target information; and
performing an input data check on the extracted market volatility model input data to validate the extracted market volatility model input data as input to an associated market volatility model.

18. The method of claim 11, wherein providing the results display includes providing a display interface component that includes information relating to validating the target information extracted by the mutant nucleotide sequence.

19. The method of claim 11, further comprising:
receiving a user interaction with the results display relating to performing additional validation on the validated synthetic DNA market data set;
initiating a second set of instructions associated with performing a second action on the validated synthetic DNA market data set; and
converting the second set of instructions to a second mutant nucleotide sequence configured to perform a second validation on the validated synthetic DNA market data set.

20. One or more non-transitory computer-readable media storing instructions that, when executed by a computing platform comprising at least one processor, a communication interface, and memory, cause the computing platform to:
initiate a set of coded instructions associated with performing an action on a synthetic DNA market data set, wherein the synthetic DNA market data set includes market data associated with a plurality of lines of business across an enterprise organization;
convert the set of coded instructions to a mutant nucleotide sequence, wherein converting the set of coded instructions including executing a transform algorithm to translate the set of coded instructions to the mutant nucleotide sequence, wherein the mutant nucleotide sequence is configured to interact with and process data from the synthetic DNA market data set;
insert the mutant nucleotide sequence into the synthetic DNA market data set;
extract, using the mutant nucleotide sequence, target information from the synthetic DNA market data set;
validate the extracted target information, wherein validating the extracted target information includes:
applying validation rules to the target information; and
analyzing the target information to detect one or more anomalies;
upon detecting one or more data anomalies, automatically reconfigure the target information to remove the one or more data anomalies and to form a validated synthetic DNA market data set; and
provide a results display on a display of the computing platform, wherein the results display includes information relating to a status of the validated synthetic DNA market data set.

* * * * *